(12) United States Patent
Ozeki et al.

(10) Patent No.: US 8,530,104 B2
(45) Date of Patent: Sep. 10, 2013

(54) METHOD OF OPERATING A FUEL CELL SYSTEM

(75) Inventors: Masataka Ozeki, Osaka (JP); Akinari Nakamura, Osaka (JP); Yoshikazu Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 382 days.

(21) Appl. No.: 12/502,263

(22) Filed: Jul. 14, 2009

(65) Prior Publication Data

US 2009/0291339 A1 Nov. 26, 2009

Related U.S. Application Data

(63) Continuation of application No. 11/010,125, filed on Dec. 10, 2004.

(30) Foreign Application Priority Data

Dec. 12, 2003 (JP) ................. 2003-414301

(51) Int. Cl.
- *H01M 8/04* (2006.01)
- *H01M 8/00* (2006.01)
- *H01M 8/18* (2006.01)
- *H01M 2/00* (2006.01)

(52) U.S. Cl.
USPC ........... 429/428; 429/400; 429/429; 429/443; 429/444

(58) Field of Classification Search
None
See application file for complete search history.

(56) References Cited

U.S. PATENT DOCUMENTS

| | | | | |
|---|---|---|---|---|
| 3,539,395 | A | * | 11/1970 | Bartas ............................. 429/17 |
| 4,657,828 | A | * | 4/1987 | Tajima .......................... 429/423 |
| 4,743,517 | A | * | 5/1988 | Cohen et al. .................. 429/425 |
| 5,434,015 | A | * | 7/1995 | Yamada et al. ................... 429/9 |

(Continued)

FOREIGN PATENT DOCUMENTS

| | | |
|---|---|---|
| CN | 1323450 A | 11/2001 |
| EP | 0374368 A1 | 6/1990 |

(Continued)

OTHER PUBLICATIONS

Official translation of JP62190660, published Aug. 20, 1987, translated by: FLS, Inc. Jan. 2009.*

(Continued)

*Primary Examiner* — Barbara Gilliam
*Assistant Examiner* — Angela Martin
(74) *Attorney, Agent, or Firm* — McDermott Will & Emery LLP

(57) ABSTRACT

A method of operating a fuel cell system including stopping power generation of a fuel cell which generates electric power using a fuel gas and an oxidizing gas, filling and keeping a combustible gas in a cathode of the fuel cell after said step, supplying the oxidizing gas to the cathode, supplying the combustible gas discharged from the cathode in response to the previous step to a combustor capable of heating a fuel generator for generating the fuel gas or an exhaust pipe connected to the combustor via a branch passage branching from an oxidizing gas passage located downstream of the cathode, diluting the combustible gas supplied to the combustor or the exhaust pipe with air supplied to the combustor or exhaust gas supplied to the exhaust pipe such that the combustible gas has a concentration lower than a combustion lower limit, and discharging the diluted combustible gas to atmosphere.

10 Claims, 9 Drawing Sheets

(56) References Cited

U.S. PATENT DOCUMENTS

| | | | |
|---|---|---|---|
| 6,331,366 B1 | 12/2001 | Van Dine et al. | |
| 6,521,204 B1 | 2/2003 | Borup et al. | |
| 6,814,944 B1 | 11/2004 | Matsui et al. | |
| 2001/0002248 A1* | 5/2001 | Ukai et al. | 423/652 |
| 2002/0122966 A1 | 9/2002 | Acker et al. | |
| 2002/0142200 A1 | 10/2002 | Formanski et al. | |
| 2003/0064274 A1* | 4/2003 | Blaszczyk et al. | 429/34 |
| 2003/0072990 A1 | 4/2003 | Sugawara et al. | |
| 2003/0077488 A1* | 4/2003 | Yamamoto et al. | 429/17 |
| 2003/0194590 A1 | 10/2003 | Cargnelli et al. | |
| 2003/0224226 A1 | 12/2003 | Jia et al. | |
| 2004/0126628 A1* | 7/2004 | Balliet et al. | 429/13 |
| 2005/0031917 A1* | 2/2005 | Margiott et al. | 429/17 |
| 2005/0129990 A1 | 6/2005 | Ozeki et al. | |
| 2009/0291339 A1 | 11/2009 | Ozeki et al. | |

FOREIGN PATENT DOCUMENTS

| | | | |
|---|---|---|---|
| EP | 0642184 | A2 | 3/1995 |
| EP | 1291948 | A1 | 3/2003 |
| JP | 54144936 | A | 11/1979 |
| JP | 62190660 | * | 8/1987 |
| JP | 62190660 | A | 8/1987 |
| JP | 63-259971 | | 10/1988 |
| JP | 63-259972 | | 10/1988 |
| JP | 03-000400 | A | 1/1991 |
| JP | 5307970 | A | 11/1993 |
| JP | 06-267573 | A | 9/1994 |
| JP | 9-298065 | A | 11/1997 |
| JP | 09-306522 | | 11/1997 |
| JP | 2001 189165 | | 7/2001 |
| JP | 2002-093448 | | 3/2002 |
| JP | 2002-104807 | | 4/2002 |
| JP | 2002-124278 | | 4/2002 |
| JP | 2002-158019 | | 5/2002 |
| JP | 2003-282114 | | 10/2003 |
| JP | 2004-067407 | | 3/2004 |
| JP | 2004-172027 | A | 6/2004 |
| JP | 2004-172049 | | 6/2004 |
| JP | 2005-071949 | | 3/2005 |
| JP | 2005-093115 | | 4/2005 |
| WO | 99/67830 | A1 | 12/1999 |
| WO | 0039877 | A1 | 7/2000 |
| WO | 01/47801 | A1 | 7/2001 |
| WO | 01/97312 | A1 | 12/2001 |
| WO | 2004/004057 | A1 | 1/2004 |

OTHER PUBLICATIONS

Japanese Office Action issued in Japanese Patent Application No. JP 2006-517870 mailed Feb. 9, 2010.
International Search Report issued on Feb. 14, 2006.
Office Action of U.S. Appl. No. 13/230,503 issued Feb. 14, 2012.
Japanese Office Action issued in Japanese Patent Application No. 2010-089288 dated Jul. 24, 2012.
Japanese Office Action, dated Mar. 5, 2013, issued in corresponding Japanese Application No. 2010-089288.

* cited by examiner

METHOD OF OPERATING A FUEL CELL SYSTEM

CROSS-REFERENCE TO RELATED APPLICATIONS

This application is a Continuation of U.S. patent application Ser. No. 11/010,125, filed Dec. 10, 2004, the disclosure of which is incorporated herein by reference.

BACKGROUND OF THE INVENTION the present invention relates to a method of operating a fuel cell system and, more particularly, to treatment of a combustible gas filled in a cathode of a fuel cell in the fuel cell system after stop of power generation.

Referring to FIG. 9, a fuel cell system 39 comprises, as main components, a polymer electrolyte fuel cell (PEFC) 1 provided with an anode 1a and a cathode 1cal, a fuel generator 2 configured to reform a feed gas for power generation such as a city gas or a natural gas by addition of water to generate a hydrogen-rich fuel gas, a water supply device 3 configured to supply water to the fuel generator 2, a feed gas supply device 36 configured to supply the feed gas to the fuel generator 2, a combustor 4 configured to combust a fuel gas unconsumed in the anode 1a of the fuel cell 1 and exhausted therefrom, a blower 5 which is an oxidizing gas supply device configured to supply an oxidizing gas (air) to the fuel cell 1 and to discharge the oxidizing gas outside the fuel cell 1, and a purge air supply device 6 configured to supply purge air to the fuel generator 2 to perform purging from the interior from the fuel generator 2 when the fuel cell system 39 stops power generation.

The fuel cell system 39 is configured to generate electric power by reacting the hydrogen-rich fuel gas supplied to the anode 1a and the air supplied to the cathode 1c as the oxidizing gas within the fuel cell 1. In a stop operation of the fuel cell system 39, finally, purging of fuel gas passages is conducted by using the purge air. The fuel cell system 39 is configured to carry out the power generation operation and the stop operation under the condition in which a controller 21 properly controls the blower 5, the feed gas supply device 36, the water supply device 3, the air supply device 6, etc.

In the fuel cell system 39, a cost can be reduced because of the absence of a nitrogen storage device, as compared to the conventional purging process in which, when the fuel cell system stops the power generation, nitrogen, instead of the feed gas, is flowed from a feed gas supply passage to the fuel generator and to the fuel cell to purge the gases (e.g., fuel gas) remaining within these components to the combustor, which treats the purged gases.

A fuel cell system which employs such air purging technique is disclosed in Womb 01/97312. In this fuel cell system, when the fuel cell stops power generation, water is supplied from a water supply device to a fuel generator to generate steam, which is used to purge a fuel gas containing hydrogen remaining within fuel gas passages, and thereafter, the air is flowed from a purge air supply device to finally perform purging from the interior of the fuel gas passages. In this fuel cell system, hydrogen of the fuel cell is driven out by the steam and then the air is supplied to the interior of the fuel cell. This makes it possible to inhibit corrosion of the passages which may be caused by water droplets resulting from steam condensation.

An anode of a polymer electrolyte fuel cell is typically comprised of alloy catalyst containing platinum and ruthenium. If the anode is exposed to air as in the conventional fuel cell system, catalyst may be oxidized by oxygen and possibly degrade catalytic performance (i.e., oxidization and degradation of the anode may take place). Considering maintaining durability of the fuel cell system, it is undesirable to fill and keep the air in the anode when the fuel cell system stops power generation.

In order to solve this problem, when the fuel cell system stops power generation, the fuel gas (e.g., hydrogen-rich fuel gas) or the feed gas (city gas or natural gas) is filled and confined in the anode of the fuel cell to inhibit entry of the air into the anode, thereby maintaining durability of the fuel cell.

In this method, apparently, oxidization and degradation of the anode may be inhibited. But, if the air (oxidizing gas) remains in the cathode after the stop of the power generation in the fuel cell system, it flows to the anode through a porous polymer electrolyte membrane and thereby the anode may be oxidized and degraded. Inventors or the like considers that the cathode is also required to be filled with the fuel gas or the feed gas to reliably avoid oxidization and degradation of the anode.

However, in a case where the cathode of the fuel cell is filled with the fuel gas or the feed gas after the stop of the power generation, the combustible feed gas or fuel gas is discharged to atmosphere when the air is supplied from an air supply system to the cathode of the fuel cell at the start of a next operation of the fuel cell.

BRIEF SUMMARY OF THE INVENTION

Briefly stated, a preferred embodiment of the present invention is directed to a method of operating a fuel cell system. The method includes stopping power generation of a fuel cell which generates electric power using a fuel gas and an oxidizing gas, filling and keeping a combustible gas in a cathode of the fuel cell after said step, supplying the oxidizing gas to the cathode, supplying the combustible gas discharged from the cathode in response to the previous step to a combustor capable of heating a fuel generator for generating the fuel gas or an exhaust pipe connected to the combustor via a branch passage branching from an oxidizing gas passage located downstream of the cathode, diluting the combustible gas supplied to the combustor or the exhaust pipe with air supplied to the combustor or exhaust gas supplied to the exhaust pipe such that the combustible gas has a concentration lower than a combustion lower limit, and discharging the diluted combustible gas to atmosphere.

The present invention has been developed under the circumstances, and an object of the present invention is to provide a fuel cell system capable of appropriately treating and discharging a combustible gas filled in a cathode of a fuel cell.

To achieve the above described object, according to the present invention, there is provided a fuel cell system comprising: a fuel cell configured to generate electric power using an oxidizing gas supplied to a cathode of the fuel cell, wherein a combustible gas is filled and kept in the cathode after stop of power generation, and is thereafter diluted by an incombustible gas when the combustible gas is discharged to atmosphere. Thereby, it is possible to appropriately treat the combustible gas filled in the cathode of the fuel cell when the fuel gas is discharged.

The combustible gas in a gas mixture containing the combustible gas and the incombustible gas is appropriately diluted to have a concentration lower than a combustion lower limit, and the gas mixture in this diluted state is discharged to atmosphere.

The fuel cell system may further comprise an oxidizing gas supply device configured to supply the oxidizing gas; an oxidizing gas passage through which the oxidizing gas supplied from the oxidizing gas supply device is guided to the cathode, and the oxidizing gas unconsumed in the cathode is discharged to atmosphere; first and second oxidizing gas passage valves respectively provided at an upstream position and a downstream position of the cathode in a flow of the oxidizing gas and configured to open and close the oxidizing gas passage; a combustible gas supply device configured to supply the combustible gas to a portion of the oxidizing gas passage which is located between the first oxidizing gas passage valve and the cathode; a diluting device configured to dilute the combustible gas purged from the cathode to a portion of the oxidizing gas passage which is located downstream of the cathode by the incombustible gas and to discharge the diluted combustible gas to atmosphere; and a controller, wherein in a stop operation of power generation in the fuel cell, the controller may be configured to close the first oxidizing gas passage valve and to supply the combustible gas from the combustible gas supply device to the oxidizing gas passage to allow the combustible gas to be filled in the cathode, and to then close the second oxidizing gas passage valve to allow the combustible gas to be kept in the cathode, and in a start operation of the power generation in the fuel cell, the controller may be configured to open at least the first oxidizing gas passage valve to supply the oxidizing gas from the oxidizing gas supply device to the cathode through the oxidizing gas passage to purge the combustible gas filled in the cathode to the portion of the oxidizing gas passage which is located downstream of the cathode, and to cause the diluting device to dilute the purged combustible gas to be discharged to atmosphere. In this manner, the combustible gas filled in the cathode can be appropriately treated. In this case, the oxidizing gas may be used as the incombustible gas.

The diluting device may include a cathode bypass passage configured to connect a portion of the oxidizing gas passage which is located upstream of the first oxidizing gas passage valve to a portion of the oxidizing gas passage which is located downstream of the second oxidizing gas passage valve, and a cathode bypass valve configured to open and close the cathode bypass passage, and when the combustible gas filled and kept in the cathode is discharged, the first and second oxidizing gas passage valves are opened, and the cathode bypass valve is opened to allow the combustible gas exhausted to the portion of the oxidizing gas passage which is located downstream of the cathode to be mixed with and diluted by the oxidizing gas flowing through the cathode bypass passage, the diluted combustible gas being discharged to atmosphere.

By adjusting passage resistance of the cathode bypass passage, the flow rate of the oxidizing gas flowing through the cathode bypass passage can be controlled. To adjust the passage resistance, for example, the flow rate of the oxidizing gas flowing through the cathode bypass passage may be controlled by adjusting an aperture diameter of a cathode bypass valve which is the cathode bypass valve disposed in the cathode bypass passage.

The diluting device may include a cathode bypass passage configured to connect a portion of the oxidizing gas passage which is located upstream of the cathode to a portion of the oxidizing gas passage which is located downstream of the second oxidizing gas passage valve, and a dividing device disposed at a connecting portion between the portion of the oxidizing gas passage which is located upstream of the cathode and the cathode bypass passage, the dividing device being configured to open and close the oxidizing gas passage and to vary a ratio of a flow rate of the oxidizing gas flowing through the cathode bypass passage to a flow rate of the oxidizing gas flowing through the oxidizing gas passage as the diluting device and the first oxidizing gas passage valve, wherein when the combustible gas filled and kept in the cathode is discharged, the second oxidizing gas passage valve may be opened and the combustible gas exhausted to the portion of the oxidizing gas passage which is located downstream of the cathode may be mixed with and diluted by the oxidizing gas flowing through the cathode bypass passage in the ratio adjusted by the dividing device, the diluted combustible gas being discharged to atmosphere.

The diluting device may include a combustion air supply device configured to supply air to a flame burner of a combustor, a cathode combustion pipe configured to extend from a position of the oxidizing gas passage between the second oxidizing gas passage valve and the cathode and to be connected to the flame burner, and a combustion pipe valve configured to open and close the cathode combustion pipe, and wherein when the combustible gas filled and kept in the cathode is discharged, the second oxidizing gas passage valve is closed and the combustion pipe valve is opened, thereby allowing the combustible gas to be guided to the flame burner through the cathode combustion pipe and to be mixed with and diluted by the air supplied from the combustion air supply device, the diluted combustible gas being discharged to atmosphere. By thus utilizing the existing combustion air supply device, the combustible gas filled in the cathode is appropriately mixed with and diluted by the air and the diluted combustible gas is discharged to atmosphere.

In this case, the combustible gas may be introduced to the flame burner during a stop period of combustion in the combustor so that a combustion state of the flame burner is not disturbed by the supply of the combustible gas.

The diluting device may include an exhaust pipe through which an exhaust gas generated by combustion in the combustor is guided to atmosphere, a cathode exhaust pipe configured to extend from a position of the oxidizing gas passage between the second oxidizing gas passage valve and the cathode and to be connected to the exhaust pipe, and an exhaust pipe valve configured to open and close the cathode exhaust pipe, and wherein when the combustible gas filled and kept in the cathode is discharged, the second oxidizing gas passage valve is closed and the exhaust pipe valve is opened, thereby allowing the combustible gas to be guided to the exhaust pipe through the cathode exhaust pipe and to be mixed with and diluted by the exhaust gas, the diluted combustible gas being discharged to atmosphere.

The diluting device may include an exhaust pipe through which an exhaust gas generated by combustion in the combustor is guided to atmosphere, the exhaust pipe being connected to a portion of the oxidizing gas passage which is located downstream of the second oxidizing gas passage valve, and wherein when the combustible gas filled and kept in the cathode is discharged, the second oxidizing gas passage valve is opened, thereby allowing the combustible gas to be guided to the exhaust pipe through the oxidizing gas passage and to be mixed with and diluted by the exhaust gas, the diluted combustible gas being discharged to atmosphere.

When the combustible gas filled in the cathode is introduced into the exhaust pipe, the combustible gas may be introduced into the exhaust pipe during a combustion period of the combustor. Thereby, the combustible gas can be introduced irrespective of the combustion in the flame burner, and consequently, a process can be simplified.

The combustor may be configured to heat a fuel generator configured to generate a fuel gas from a feed gas.

The fuel cell system may further comprises a fuel generator configured to generate a fuel gas from a feed gas, wherein the fuel gas may be supplied from the fuel generator to an anode of the fuel cell to generate electric power, and the combustible gas may be one of the feed gas and the fuel gas.

The fuel cell system may further comprise a hydrogen supply device configured to supply hydrogen, wherein the hydrogen may be supplied from the hydrogen supply device to an anode of the fuel cell to generate electric power, and the combustible gas may be hydrogen.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Hereinafter, preferred embodiments of the present invention will be described with reference to the drawings.

Embodiment 1

Now, a first embodiment of the present invention will be described with reference to the drawings.

Figure 1:
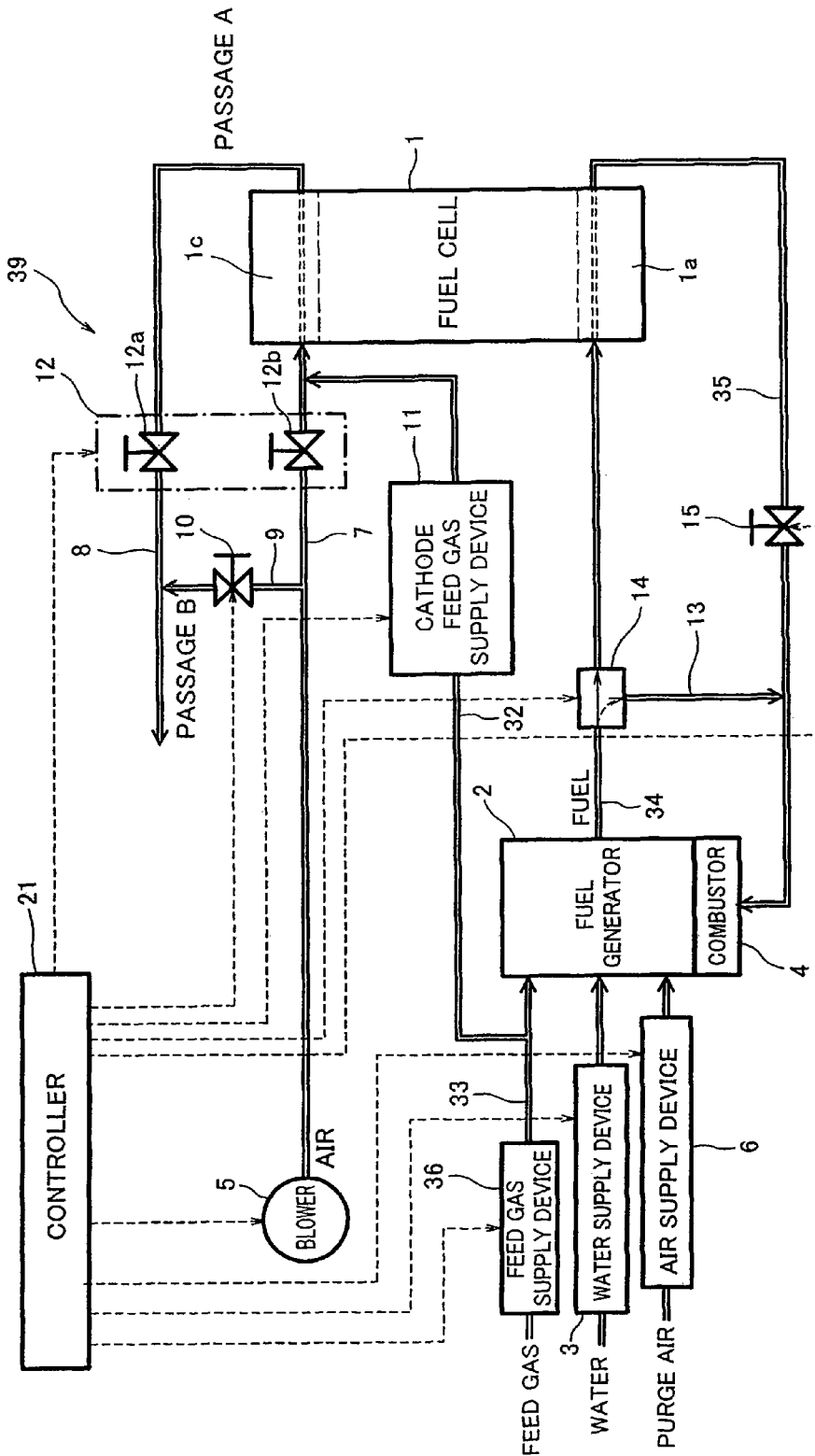
FIG. 1 is a block diagram schematically showing a construction of a fuel cell system according to a first embodiment of the present invention.

FIG. 1 is a block diagram schematically showing a construction of a fuel cell system according to a first embodiment of the present invention.

Referring now to FIG. 1, a fuel cell system 39 comprises, as main components, a feed gas supply device 36, a polymer electrolyte fuel cell (PEFC) 1, a fuel generator 2, a water supply device 3, a combustor 4, a purge air supply device 6, and a blower 5. The feed gas supply device 36 is configured to supply a feed gas for power generation such as a city gas or a natural gas to the fuel generator 2 through a material supply pipe 33. The polymer electrolyte fuel cell 1 is configured to generate electric power using a fuel gas and an oxidizing gas (air). The fuel generator 2 is configured to reform the feed gas by adding water to generate a hydrogen-rich fuel gas. The water supply device 3 is configured to supply water to the fuel generator 2. The combustor 4 is configured to combust a fuel gas unconsumed in an anode 1a of the fuel cell 1 and exhausted therefrom. The purge air supply device 6 is configured to supply purge air to the fuel generator 2 when the fuel cell system 39 stops power generation. The blower 5, which is an oxidizing gas supply device, is configured to supply the oxidizing gas to a cathode 1c of the fuel cell 1, and to exhaust remaining oxidizing gas from the cathode 1c.

A gas pipe system of the fuel cell system 39 includes a cathode supply pipe 7, a cathode discharge pipe 8, a cathode bypass pipe 9, a cathode bypass valve 10, a cathode closing device 12, a material supply pipe 33, an anode supply pipe 34, a fuel gas return pipe 35, a return pipe valve 15, an anode bypass pipe 13, a cathode feed gas supply pipe 32, and a cathode feed gas supply device (combustible gas supply device) 11. The air is supplied from the blower 5 to the cathode 1c of the fuel cell 1 through the cathode supply pipe (oxidizing gas passage) 7. The remaining air exhausted from the cathode 1c of the fuel cell 1 is discharged to atmosphere through the cathode discharge pipe 8. The cathode bypass pipe 9, which is a cathode bypass passage, is provided to connect the cathode supply pipe 7 to the cathode discharge pipe 8 and configured to guide the air supplied from the blower 5 to the cathode discharge pipe 8 without flowing the air through the fuel cell 1. The cathode bypass valve 10 is provided in the cathode bypass pipe 9 and configured to open and close the cathode bypass pipe 9. The cathode closing device 12 is comprised of a first exit-side valve (second oxidizing gas passage valve) 12a and a first inlet-side valve (first oxidizing gas passage valve) 12b configured to open and close an exit and an inlet of the cathode 1c of the fuel cell 1, respectively. The feed gas is supplied from the feed gas supply device 36 to the fuel generator 2 through the material supply pipe 33. The fuel gas from the fuel generator 2 is guided to the anode 1a of the fuel cell 1 through the anode supply pipe 34 and a passage switching device 14. The remaining fuel gas is exhausted from the anode 1a of the fuel cell 1 to the combustor 4 through the fuel gas return pipe 35. The return pipe valve 15 is provided in the fuel gas return pipe 35 and configured to open and close the fuel gas return pipe 35. The fuel gas from the fuel generator 2 is guided by the passage switching device 14 to flow to the anode bypass pipe 13, and guided to a portion of the fuel gas return pipe 35 which is located downstream of the return pipe valve 15 in a flow of the fuel gas. The cathode feed gas supply pipe 32 is configured to connect the material supply pipe 33 to the portion of the cathode supply pipe 7 which is located downstream of the first inlet-side valve 12b in a flow of the feed gas. The cathode feed gas supply device 11 is provided in the cathode feed gas supply pipe 32 and configured to introduce the feed gas into the cathode 1c.

The cathode bypass pipe 9 is configured to connect a portion of the cathode supply pipe (oxidizing gas passage) 7 which is located upstream of the first inlet-side valve (first oxidizing gas passage valve) 12b in a flow of the oxidizing gas to a portion of the cathode discharge pipe (oxidizing gas passage) 8 which is located downstream of the first exit-side valve (second oxidizing gas passage valve) 12a. A combustible gas diluting device is formed by the cathode bypass passage 9 and the cathode bypass valve 10 configured to open and close the cathode bypass pipe 9.

The cathode bypass valve 10, the first exit-side valve 12a and the first inlet-side valve 12b of the cathode closing device 12, and the return pipe valve 15 are each formed by an electromagnetic valve. The passage switching device 14 is formed by, for example, a three-way valve. The cathode feed gas supply device 11 is formed by, for example, an electromagnetic valve or a pump.

The controller 21 is electrically connected to the blower 5, the feed gas supply device 36, the water supply device 3, the purge air supply device 6, the cathode feed gas supply device 11, and the valves 10, 12a, 12b, 14, and 15 and configured to control these components, thereby controlling the operation of gas supply system of the fuel cell system 39 to be described later. The control executed by the controller 21 is represented by a dashed line in FIG. 1. Although not shown, the controller 21 is electrically connected to sensors (a temperature sensor or a flow rate meter) and configured to receive detection signals from these sensors and to properly control operations including start-up, power generation, and stop of the fuel cell system 39.

Hereinbelow, the operation of the fuel cell system 39 in a power generation period, including a stop operation and a start operation (start-up operation) of power generation, will be described with reference to FIG. 1.

During the power generation period of the fuel cell system 39, the feed gas supplied from the feed gas supply device 36 and the water supplied from the water supply device 3 are reformed within the fuel generator 2 to generate a hydrogen-rich fuel gas with the temperature of the fuel generator 2 kept at approximately 700° C. The fuel gas from the fuel generator 2 flows through the passage switching device 14 provided in the anode supply pipe 34 (which allows the anode supply pipe 34 and the anode 1a to communicate with each other) and into the anode 1a of the fuel cell 1. The air is supplied from the blower 5 to the cathode 1c of the fuel cell 1 through the cathode supply pipe 7 and the first inlet-side valve 12b in an open position. Within the fuel cell 1, the fuel gas (hydrogen) and the air (oxidizing gas) are consumed to generate electric power. The fuel gas unconsumed in the power generation of the fuel cell 1 is guided to the combustor 4 through the fuel gas return pipe 35 and the return pipe valve 15 in an open position and then combusted within the combustor 4 to generate a heat source for keeping the temperature of the fuel generator 2. The air unconsumed in the power generation of the fuel cell 1 is discharged to atmosphere through the cathode discharge pipe 8 and the first exit-side valve 12a in an open position.

When the fuel cell system 39 stops power generation, the gas supply to the cathode 1c of the fuel cell 1 is controlled as described below.

The operation of the blower 5 is stopped to stop the air supply to the cathode 1c. The cathode feed gas supply device 11 operates to allow the feed gas (combustible gas) to be guided to the portion of the cathode supply pipe 7 which is located downstream of the first inlet-side valve 12b through the cathode feed gas supply pipe 32 and to be supplied to the cathode 1c of the fuel cell 1 through this portion of the cathode supply pipe 7. At this time, the first inlet-side valve 12b is closed and the first exit-side valve 12a is opened. The feed gas supplied to the cathode 1c purges the air remaining in the cathode 1c so that the air is discharged to atmosphere from the cathode 1c through the cathode discharge pipe 8. When it is determined that almost all the air remaining in the cathode 1c has been purged, the first exit-side valve 12a of the cathode closing device 12 is closed, and the supply of the feed gas to the cathode 1c of the fuel cell 1 is stopped by closing the cathode feed gas supply device 11 in a case where the cathode feed gas supply device 11 is formed by a valve. Since the amount of air remaining in the cathode 1c can be known in advance, the amount of the feed gas capable of purging almost all the air is determined based on the amount of remaining air.

The pressure of the feed gas which exists in the material supply pipe 33 just after an exit of the feed gas supply device 36 has been increased by approximately 2 kPa. By opening the valve, which is the cathode feed gas supply device 11 provided in the cathode feed gas supply pipe 32, with one end of the cathode feed gas supply pipe 32 connected to the portion of the material supply pipe 33 which is located just after the exit of the feed gas supply device 36 and the other end thereof connected to the portion of the cathode supply pipe 7 which is located downstream of the first inlet-side valve 12b, the feed gas can be flowed from the portion of the cathode supply pipe 7 which is located downstream of the first inlet-side valve 12b into the cathode 1 by utilizing an internal pressure of the feed gas. If the pressure is insufficient to supply the feed gas, a feed pump may be used as the cathode feed gas supply device 11 to send the feed gas under pressure to the cathode 1c.

When the fuel cell system 39 stops power generation, the supply of the gases to the fuel generator 2 and to the anode 1a of the fuel cell 1 is controlled as described below.

The passage switching device 14 forms the bypass passage (allowing the anode supply pipe 34 and the anode bypass pipe 13 to communicate with each other), and the valve 15 is closed. Thereby, the fuel gas (hydrogen-rich gas) remaining in the anode 1a of the fuel cell 1 is confined therein, and under this condition, the supply of the fuel gas from the fuel generator 2 to the anode 1a is stopped.

After the power generation has been stopped by the above-described operation, the fuel gas (hydrogen-rich gas) is filled and kept in the anode 1a, and the combustible gas (feed gas) is filled and kept in the cathode 1c. As a result, it is possible to inhibit oxidization and degradation of the anode 1a.

Following this, the water supply device 3 is operated to supply the water to the fuel generator 2. The water supplied to the fuel generator 2 is evaporated into steam by the heat of the fuel generator 2, and the steam drives out the hydrogen-rich fuel gas remaining in the fuel generator 2 into the anode supply pipe 34. The fuel gas and the steam are returned to the combustor 4 by the passage switching device 14 through the anode bypass pipe 13 and the fuel gas return pipe 35 and combusted therein. By continuing such an operation, the combustible gas contained in the fuel gas is diluted to lower its concentration, and in time, the combustor 4 stops combustion, while the steam continues to be generated by the remaining heat in the fuel generator 2.

When the amount of steam generated in the fuel generator 2 becomes sufficient to purge the hydrogen-rich fuel gas in the fuel generator 2, and the temperature of the fuel generator 2 decreases to approximately 400° C., the supply of the water from the water supply device 3 is stopped. Thereafter, the air is supplied from the purge air supply device 6 to the fuel generator 2 to allow the steam in the fuel generator 2 to be purged from the fuel generator 2 to the anode supply pipe 34, and the passage switching device 14 causes the air to return to the combustor 4 through the anode bypass pipe 13 and the fuel gas return pipe 35. The air is discharged from the combustor 4 to atmosphere. After the air has completely purged the steam from the interior of the fuel generator 2 or the interior of the pipes 34, 13, and 35, the operation of the purge air supply device 6 is stopped to stop the supply of the air, and thereby the stop operation of the fuel cell system 39 is terminated.

The temperature of 400° C., which is herein used as the reference, is set considering a predetermined safety ratio to inhibit degradation of performance which is caused by oxidization and degradation of ruthenium catalyst exposed to air under a high-temperature condition, assuming that a catalyst mainly containing ruthenium is used in the fuel generator 2. For this reason, the set temperature shifts according to the safety ratio, and varies according to the type of catalyst (e.g., nickel catalyst).

Subsequently, when the fuel cell system 39 starts the power generation (start-up operation), the supply of the gas to the cathode 1c of the fuel cell 1 is controlled as described below.

The first inlet-side and exit-side valves 12b and 12a of the cathode closing device 12 and the cathode bypass valve 10 are opened and the air starts to be supplied from the blower 5 to the cathode 1c through the cathode supply pipe 7. The air supplied from the blower 5 flows through a passage A, i.e., from the cathode supply pipe 7 to the cathode discharge pipe 8 through the cathode 1c of the fuel cell 1, and a passage B, i.e., from the cathode supply pipe 7 to the cathode bypass pipe 9 to pass through the cathode bypass valve 10.

The air flowing through the passage A purges the feed gas containing the combustible gas filled in the cathode 1c to the cathode discharge pipe 8, along with the air. The purged combustible gas is mixed with the air flowing through the passage B at a point where the cathode bypass pipe 9 is connected to the cathode discharge pipe 8. As a result, the combustible gas in a gas mixture is diluted to have a concentration lower than a combustion lower limit, and finally discharged to outside the fuel cell system 39 (to atmosphere).

The flow rate of the air flowing through the passage A and the flow rate of the air flowing through the passage B are set so that the combustible gas in the gas mixture discharged to outside the fuel cell system 39 is set to have a concentration lower than the combustion lower limit. In the case of using a city gas identified by "13A" which is available in a big city such as the feed gas, since the city gas 13A has a combustion range of approximately 5 to 15% in a mixing ratio with respect to the air, the concentration of the combustible gas in the gas mixture finally discharged can be decreased to lower than 5% by controlling setting so that the flow rate of the air per unit time flowing through the passage B becomes greater than twenty times as high as the flow rate per unit of time flowing through the passage A. Since the passage resistance of the gas mixture flowing through the passage A is predictable, (flow rate of the passage B per unit time)/(flow rate of the passage A per unit time)>20 can be set by adjusting, for example, an aperture diameter of the valve which is the cathode bypass valve 10 to control the resistance of the passage B. Alternatively, the passage resistances may be controlled by adjusting the lengths of the pipes of the passages A and B.

After the feed gas filled in the cathode 1c of the fuel cell 1 has been discharged outside the fuel cell system 39, the cathode bypass valve 10 is closed so that the air from the blower 5 is supplied only to the cathode 1c, thereby enabling power generation to start.

When the fuel cell system 39 starts the power generation (start-up operation), the gas supply to the anode 1a of the fuel cell 1 is controlled as described below.

The passage switching device 14 operates to form the bypass passage, and the feed gas is supplied from the feed gas supply device 36 to the fuel generator 2 through the material supply pipe 33. The fuel gas driven out from the interior of the fuel generator 2 is returned to a flame burner 41 (see FIG. 4) of the combustor 4 through the anode bypass pipe 13 and the fuel gas return pipe 35 by the switching operation of the passage switching device 14, and combusted therein. Simultaneously, the water is supplied from the water supply device 3 to the fuel generator 2. And, the fuel in the combustor 4 is heated to cause the temperature of the fuel generator 2 up to 700° C. and the fuel generator 2 is kept under the condition in which the hydrogen-rich fuel gas can be generated from the feed gas and the steam.

When the temperature of a CO (carbon monoxide) reducing portion accommodated in the fuel generator 2 reaches a stable reaction temperature and CO contained in the fuel gas is removed to a concentration (approximately 20 ppm) which will not degrade the anode 1a of the fuel cell 1, the return pipe valve 15 provided in the fuel gas return pipe 35 is opened, and the passage switching device 14 forms the supply passage to the anode 1a (allowing the anode supply pipe 34 and the anode 1a to communicate with each other), and under this condition, the fuel gas exhausted from the fuel generator 2 is guided to the anode 1a of the fuel cell 1 through the passage switching device 14, and the fuel gas unconsumed in the anode 1a is returned to the combustor 4 through the fuel gas return pipe 35 and the return pipe valve 15 and combusted therein. Under this condition, the power generation can start.

As should be appreciated, when the fuel cell system 39 starts the power generation, the incombustible oxidizing gas (e.g., air) supplied from the blower 5 flows through the passage A, i.e., from the cathode supply pipe 7 to the cathode discharge pipe 8 through the fuel cell 1, and flows through the passage B, i.e., to the cathode bypass pipe 9 provided with the cathode bypass valve 10. With the passages A and B set to have predetermined resistances, the air flows therethrough.

When the combustible feed gas (e.g., city gas 13A) filled in the cathode 1c is purged from the cathode 1c by the air supplied from the blower 5 and flowing through the passage A, and discharged to the cathode discharge pipe 8 along with the air, the air flowing through the passage B is mixed with the combustible feed gas so that the combustible gas in the gas mixture is diluted to have a concentration lower than the combustion lower limit, and the diluted combustible gas is discharged to atmosphere. In this manner, the combustible gas filled in the cathode 1c can be appropriately treated.

During the stop period of the power generation in the fuel cell system 39, the feed gas can be filled and kept in the cathode 1c of the fuel cell 1. In addition, the combustible gas (fuel gas) is confined in the anode 1a. This makes it possible to completely eliminate a cause of oxidization of the catalyst of the anode 1a of the fuel cell 1, and hence to avoid reduction of durability of the anode 1a of the fuel cell system 39.

Further, since the stop operation and keeping operation of the fuel cell system 39 is carried out with the first inlet-side and exit-side valves 12b and 12a of the cathode closing device 12 closed, the feed gas supplied to the cathode 1c of the fuel cell 1 by the cathode feed gas supply device 11 is reliably confined in the fuel cell 1. If the feed gas is kept for a long time period under a stopped state of the fuel cell 1, the air from outside will not enter the cathode 1c of the fuel cell 1. Consequently, degradation of durability of the fuel cell system 39 can be inhibited.

Embodiment 2

Figure 2:
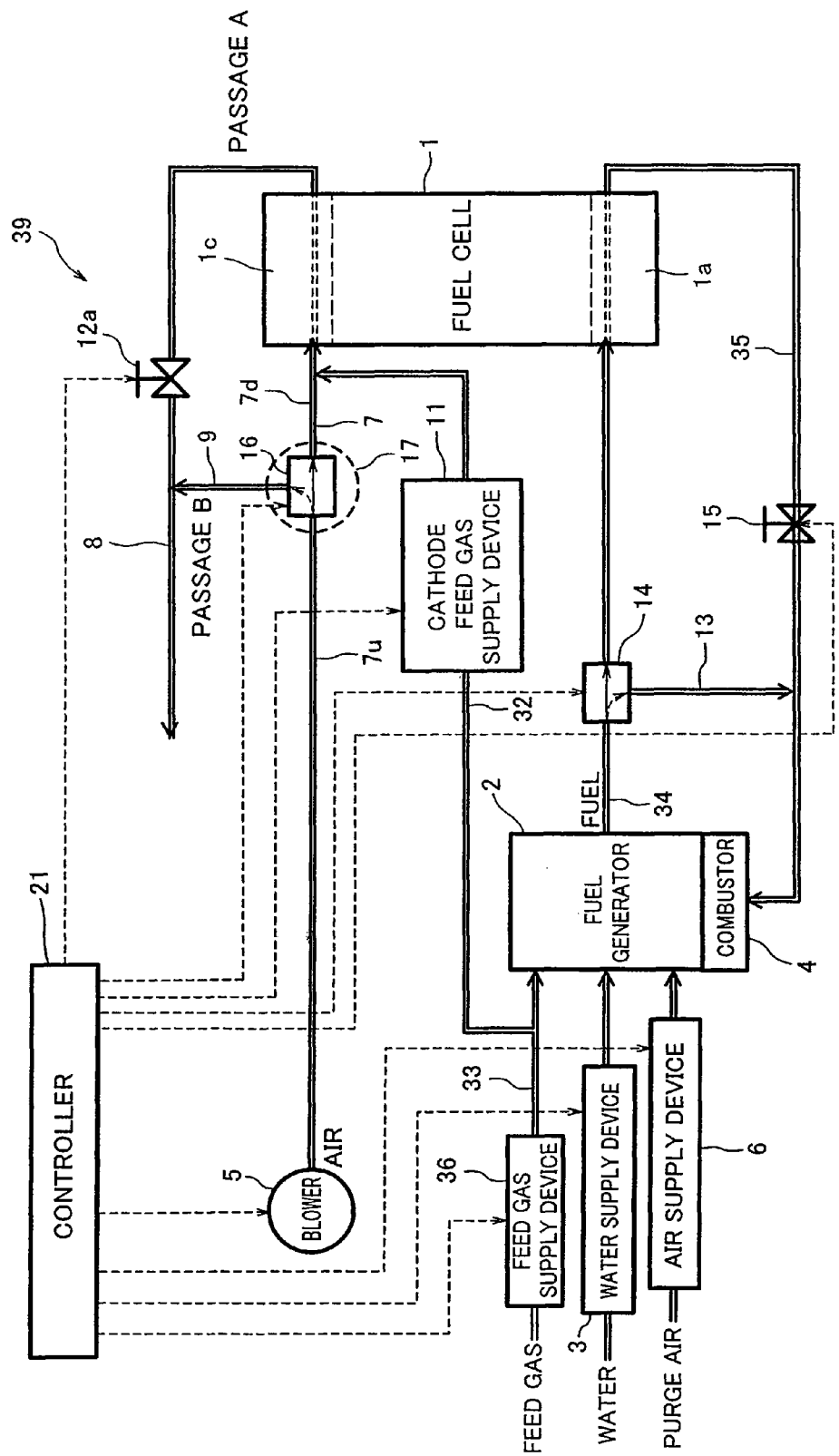
FIG. 2 is a block diagram schematically showing a construction of a fuel cell system according to a second embodiment of the present invention.

FIG. 2 is a block diagram schematically showing a construction of a fuel cell system according to a second embodiment of the present invention. The construction of the second embodiment illustrates an alternation of the cathode bypass passage in the first embodiment. In FIG. 2, the same reference numerals as those in FIG. 1 denotes the same or corresponding parts.

Referring to FIG. 2, the cathode bypass valve 10 of the first embodiment (see FIG. 1), provided in the cathode bypass pipe 9 which is the cathode bypass passage, has been replaced by a dividing device 16 provided at a connecting portion 17 at which the cathode bypass pipe 9 is connected to the cathode supply pipe 7. The dividing device 16 allows the air flowing through an upstream cathode bypass pipe 7u to be divided into the air flowing through a downstream cathode supply pipe 7d and the air flowing through the cathode bypass pipe 9. While the dividing device 16 is used instead of the first inlet-side valve 12b (see FIG. 1) of the cathode closing device 12, the first exit-side valve 12a as the cathode exit-side closing device exists in the construction in FIG. 2.

The combustible gas diluting device is formed by the cathode bypass pipe 9 (cathode bypass passage) connecting the portion of the cathode supply pipe 7 (portion of the oxidizing gas passage which is located upstream of the cathode 1c) to the portion of the cathode discharge pipe 8 (oxidizing gas passage) which is located downstream of the first exit-side valve 12a (second oxidizing gas passage valve), and the dividing device 16 disposed at the connecting portion 17 between the upstream portion and the cathode bypass passage 9 and configured to open and close the cathode supply pipe 7 instead of the first inlet-side valve (first oxidizing gas passage valve) 12b and to vary division ratio of the flow rate of the oxidizing gas (air) flowing through the cathode bypass pipe 9 to the flow rate of the oxidizing gas flowing through the oxidizing gas passage 8.

A three-way valve, capable of setting a desired division ratio, may be used as the dividing device 16. The dividing device 16 adjusts the ratio between the flow rate of the air flowing through the downstream cathode supply pipe 7d and the flow rate of the air flowing through the cathode bypass pipe 9. The adjustment of the division ratio made by the dividing device 16 is controlled by the controller 21.

Hereinbelow, the operation of the fuel cell system 39 in the power generation period, including the stop operation and the start operation (start-up operation) of the power generation, will be described with reference to FIG. 2. The operation identical to that of the first embodiment is briefly described.

During a time period of the power generation of the fuel cell system 39, the fuel gas from the fuel generator 2 is supplied to the anode 1a of the fuel cell 1 through the passage switching device 14 provided in the anode supply pipe 34. The dividing device 16 operates so that all the air blown from the blower 5 flows to the downstream cathode supply pipe 7d to allow this air to be supplied to the cathode 1c of the fuel cell 1. In the interior of the fuel cell 1, the fuel gas (hydrogen) and the air (oxidizing gas) are consumed to generate electric power.

When the fuel cell system 39 stops the power generation, the gas supply to the cathode 1c of the fuel cell 1 is controlled as described below.

The operation of the blower 5 is stopped to stop the air supply to the cathode 1c. Then, the valve which is the cathode feed gas supply device 11 is opened, and the combustible feed gas is guided to the downstream cathode supply pipe 7d through the cathode feed gas supply pipe 32 and to the cathode 1c of the fuel cell 1 through the downstream cathode pipe 7d. At this time, the first exit-side valve 12a is opened. The dividing device 16 operates so that the ratio of the flow rate of the air flowing through the cathode bypass pipe 9 to the flow rate of the air flowing through the upstream cathode supply pipe 7u is set to 1 and the ratio of the flow rate of the air flowing through the downstream cathode supply pipe 7d to the flow rate of the air flowing through the upstream cathode supply pipe 7u is set to 0. When it is determined that the feed gas supplied to the cathode 1c (by the operation of the cathode feed gas supply device 11 of the first embodiment) has purged the air remaining in the cathode 1c of the fuel cell 1, the first exit-side valve 12a is closed and the supply of the feed gas to the cathode 1c of the fuel cell 1 is stopped by closing the cathode feed gas supply device 11 in a case where the cathode feed gas supply device 11 is formed by a valve.

The gas is supplied to the anode 1a of the fuel cell 1 during the stop operation of the power generation as in the first embodiment.

After the power generation has been stopped by the above described operation, the fuel gas (hydrogen-rich gas) is filled and kept in the anode 1a and the combustible gas (feed gas) is filled and kept in the cathode 1c, thereby inhibiting oxidization and degradation of the anode 1a.

When the fuel cell system 39 starts power generation (start-up operation), the gas supply to the cathode 1c of the fuel cell 1 is controlled as described below.

The first exit-side valve 12a is opened and the air starts to be supplied from the blower 5 to the cathode 1c through the cathode supply pipe 7. At this time, the air supplied from the blower 5 flows through a passage A in such a manner that the air flowing through the upstream cathode supply pipe 7u is divided to flow through the downstream cathode supply pipe 7d and through the cathode 1c and to be discharged into the cathode discharge pipe 8, or flows through a passage B in such a manner that the air flowing through the upstream cathode supply pipe 7u is divided by the dividing device 16 to flow through the cathode bypass pipe 9 and to be discharged into the cathode discharge pipe 8.

The air flowing through the passage A purges the feed gas filled in the cathode 1c to the cathode discharge pipe 8, along with the air. The purged feed gas is mixed with the air flowing through the passage B at a point where the cathode bypass pipe 9 is connected to the cathode discharge pipe 8. As a result, the combustible gas in the gas mixture is diluted to have a concentration lower than the combustion lower limit, and finally discharged to outside the fuel cell system 39 (to atmosphere).

The flow rate of the air flowing through the passage A and the flow rate of the air flowing through the passage B are adjusted by the dividing device 16 in such a manner that a ratio between these flow rates is set so that the concentration of the combustible gas in the gas mixture discharged outside the fuel cell system 39 becomes lower than the combustion lower limit.

In the case of using the city gas 13A available in a big city as the feed gas, since the city gas 13A has a combustion range of about 5 to 15% as a mixing ratio with air, the concentration of the combustible gas in the gas mixture finally discharged can be decreased to lower than 5% by setting the ratio in the dividing device 16 so that the flow rate of the air per unit time flowing through the passage B becomes more than 20 times as high as the flow rate of the air per unit time flowing through the passage A.

After all the feed gas filled in the cathode 1c of the fuel cell 1 has been discharged outside the fuel cell system 39, the ratio in the dividing device 16 is set so that all the air supplied from the blower 5 is flowed into the downstream cathode supply pipe 7d and to the cathode 1c of the fuel cell 1, thereby enabling power generation to start.

The gas is supplied to the anode 1a of the fuel cell 1 at the start of the power generation as in the first embodiment.

As should be appreciated from the foregoing, when the fuel cell system 39 starts the power generation, the incombustible oxidizing gas (e.g., air) supplied from the blower 5 is divided by the dividing device 16 provided at the connecting portion 17 to flow through the passage A, i.e., from the cathode supply pipe 7 to the cathode discharge pipe 8 through the cathode 1c of the fuel cell 1, and to flow through the passage B, i.e., to the cathode discharge pipe 8 through the cathode bypass pipe 9.

The ratio between the flow rate of the air flowing through the passage A and the flow rate of the air flowing through the passage B is adjusted by the dividing device 16.

When the air flowing through the passage A purges the combustible feed gas (e.g., city gas 13A) filled in the cathode 1c such that the feed gas is discharged into the cathode discharge pipe 8 along with the air, the feed gas is mixed with the air flowing through the passage B so that the combustible gas in the gas mixture is diluted to have a concentration lower than the lower limit concentration, and in this diluted state, the gas mixture is discharged to atmosphere. In this manner, the combustible gas filled in the cathode 1c can be appropriately treated.

During the stop period of the power generation in the fuel cell system 39, the feed gas can be filled and kept in the cathode 1c of the fuel cell 1. In addition, the combustible gas (fuel gas) is confined in the anode 1a. This makes it possible to completely eliminate a cause of oxidization of the catalyst in the anode 1a of the fuel cell 1, and hence to avoid reduction of durability of the anode 1a of the fuel cell system 39.

Further, since the stop operation and keeping operation of the fuel cell system 39 are carried out under the condition in which the first exit-side valve 12a of the cathode closing device 12 is closed and the upstream cathode supply pipe 7u and the downstream cathode supply pipe 7d are fluidically disconnected, the feed gas supplied to the cathode 1c of the fuel cell 1 by the cathode feed gas supply device 11 can be reliably confined in the fuel cell 1, and if the feed gas is kept for a long time period under the stopped state of the fuel cell 1, the air will not enter the cathode 1c of the fuel cell 1. Consequently, reduction of durability of the fuel cell system 39 can be inhibited.

Embodiment 3

Figure 3:
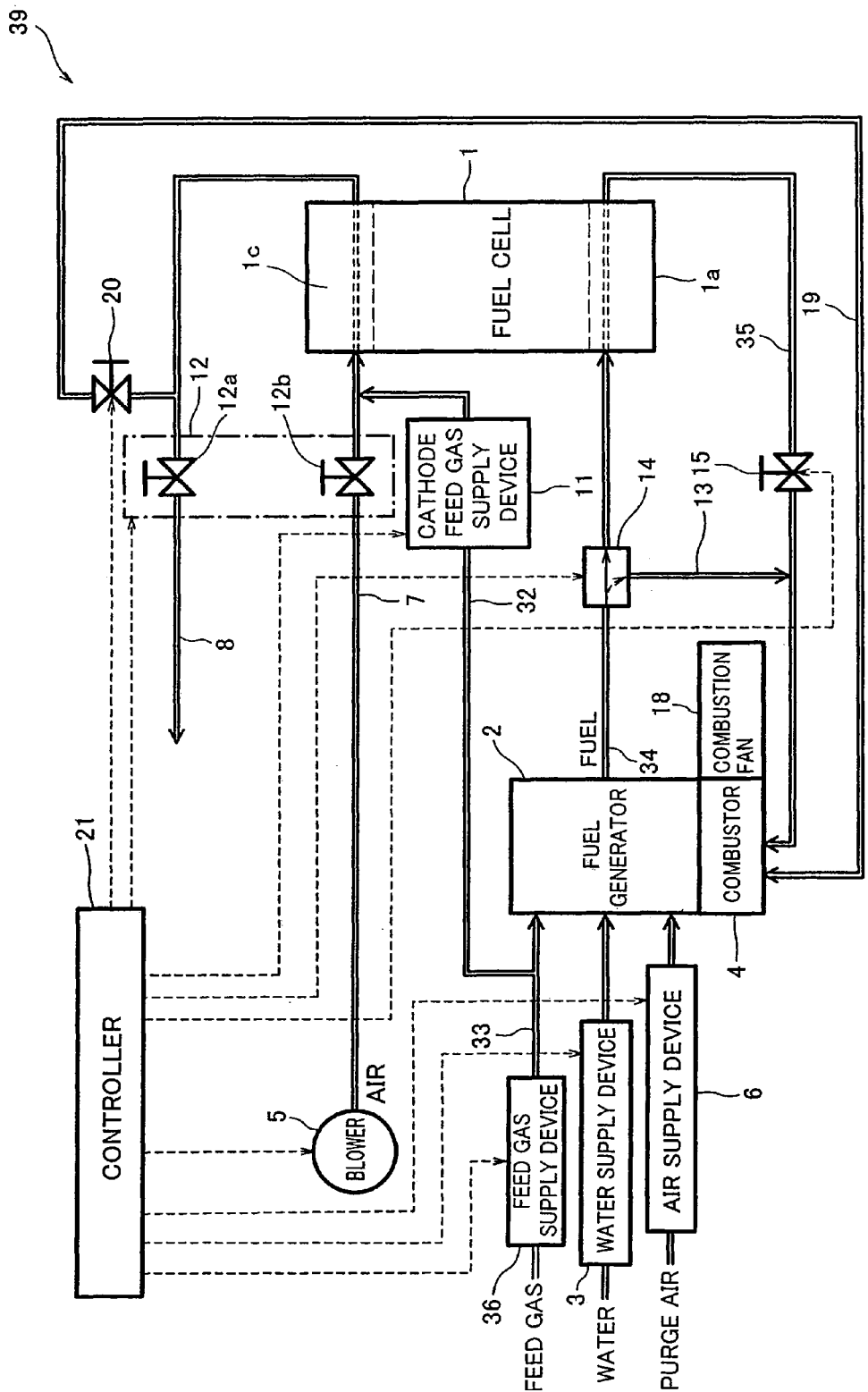
FIG. 3 is a block diagram schematically showing a construction of a fuel cell system according to a third embodiment of the present invention.

FIG. 3 is a block diagram schematically showing a construction of a fuel cell system according to a third embodiment of the present invention. As shown in FIG. 3, the piping and valve structures associated with post-treatment of the feed gas filled in the cathode 1a in the construction of the first embodiment (FIG. 1) have been altered in the construction of the third embodiment. In FIG. 3, the same reference numerals as those in FIG. 1 denote the same or corresponding parts, which will not be further described.

In the construction shown in FIG. 3, the cathode bypass pipe 9 and the cathode bypass valve 10 (see FIG. 1) of the first embodiment have been replaced by a cathode combustion pipe 19 configured to branch from a position of the cathode discharge pipe 8 which is located upstream of the first exit-side valve 12a and to be connected to the combustor 4 (more specifically, a flame burner 41 of the combustor 4 in FIG. 4), and a combustion pipe valve 20 provided in the cathode combustion pipe 19 and configured to start and stop air supply to the cathode combustion pipe 19. For example, an electromagnetic valve is used as the combustion pipe valve 20 and controlled by the controller 21.

A combustion fan (combustion air supply device) 18 in FIG. 3 is connected to the combustor 4 and configured to supply air for heating the fuel generator 2 to the flame burner 41 of the combustor 4.

The combustible gas diluting device is formed by the combustion fan (combustion air supply device) 18 configured to supply the air to the flame burner 41 of the combustor 4, the cathode combustion pipe 19 extending from the position of the cathode discharge pipe (oxidizing gas passage) 8 between the first exit-side valve (second oxidizing gas passage opening and losing device) 12a and the cathode 1c and connected to the flame burner 41, and the combustion pipe valve 20 configured to open and close the cathode combustion pipe 19.

Hereinafter, an operation of the fuel cell system 39, including a stop operation and a start operation (start-up operation) of the power generation in the fuel cell system 39 will be described in detail. The operation of the fuel cell system 39 in a power generation period is similar to that of the first embodiment, and will not be further described.

In the stop operation of the fuel cell system 39, the gas supply to the cathode 1c of the fuel cell 1 is controlled as described below.

The operation of the blower 5 is stopped to stop the air supply to the cathode 1c of the fuel cell 1. The feed gas containing the combustible gas flows through the cathode feed gas supply pipe 32 and is guided by the cathode feed gas supply device 11 to the portion of the cathode supply pipe 7 which is located downstream of the first inlet-side valve 12b, and to the cathode 1c of the fuel cell 1 through this portion of the cathode supply pipe 7 (corresponding to the operation of the cathode feed gas supply device 11 of the first embodiment). At this time, the first inlet-side and exit-side valves 12b and 12a are closed and the combustion pipe valve 20 is opened. By the feed gas supplied to the cathode 1c, the air remaining in the cathode 1c of the fuel cell 1 is purged therefrom flow through the combustion pipe valve 20 and the cathode combustion pipe 19 and discharged from the combustor 4 to outside. When it is determined that almost all the air remaining in the cathode 1c has been discharged, the combustion pipe valve 20 is closed and the supply of the feed gas to the cathode 1c of the fuel cell 1 is stopped by closing the cathode feed gas supply device 11.

The gas supply to the anode 1a of the fuel cell 1 during the stop operation of power generation is similar to that of the first embodiment.

After the fuel cell system 39 has stopped power generation by the above described operation, the fuel gas (hydrogen-rich gas) is filled and kept in the anode 1a, and the combustible gas (feed gas) is filled and kept in the cathode 1c, thereby inhibiting oxidization and degradation of the anode 1a.

When the fuel cell system 39 starts power generation (start-up operation), the gas supply to the cathode 1c of the fuel cell 1 is controlled as described below.

The first inlet-side valve 12b and the combustion pipe valve 20 are opened, and the first exit-side valve 12a is closed. Under this condition, the air starts to be supplied from the blower 5 to the cathode 1c of the fuel cell 1 through the cathode supply pipe 7. The air supplied from the blower 5 purges the combustible feed gas filled in the cathode 1c. That is, the feed gas is discharged into the cathode discharge pipe 8 along with the air flowing from the cathode supply pipe 7 to the cathode discharge pipe 8 through the cathode 1c of the fuel cell 1. Then, the discharged feed gas flows to the flame burner 41 of the combustor 4 through the combustion pipe valve 20 and the cathode combustion pipe 19.

Figure 4:
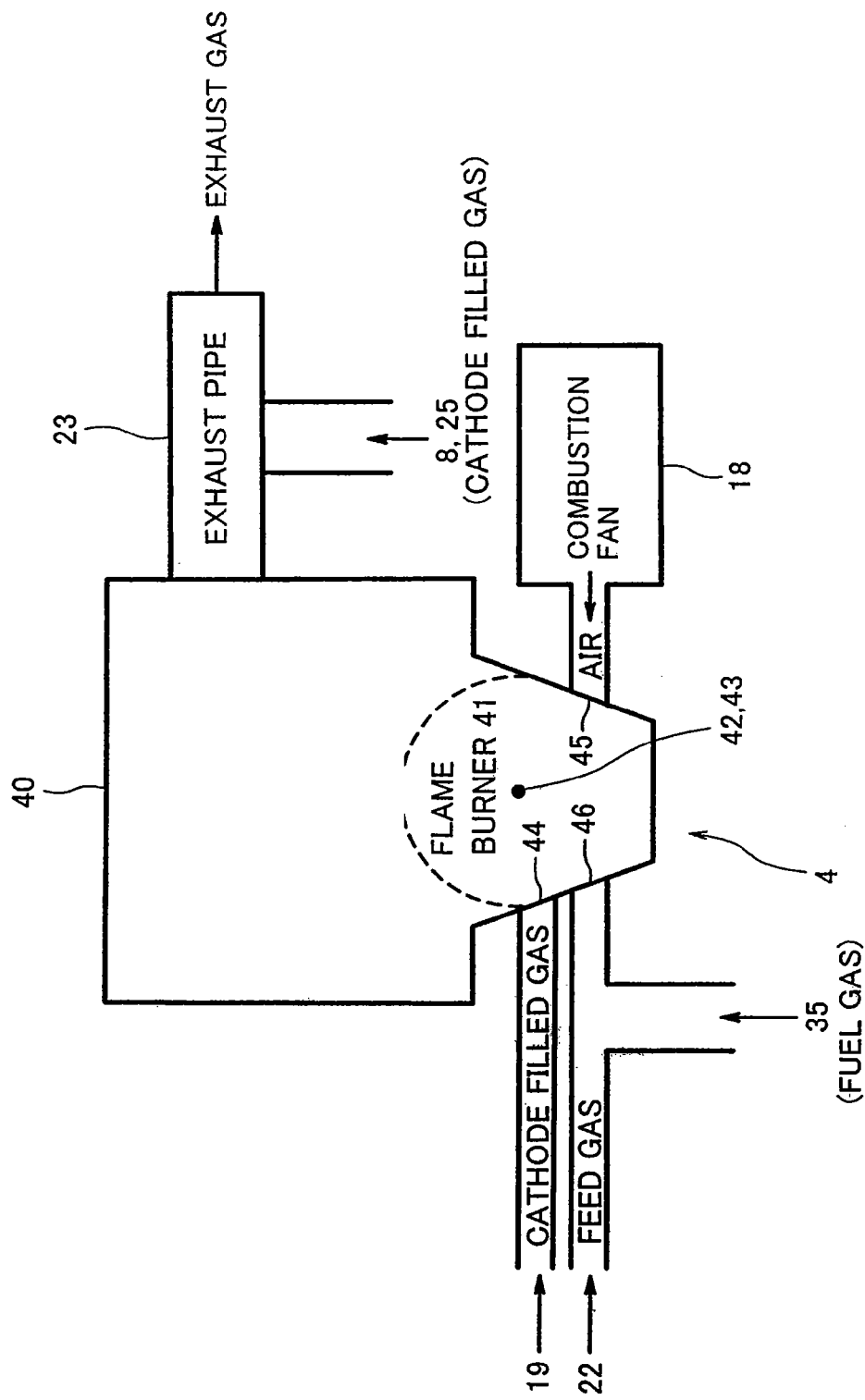
FIG. 4 is a cross-sectional view schematically showing a combustor and its surroundings.

With reference to FIG. 4, the internal construction of the combustor 4 and then, how the combustible gas (feed gas) filled in the cathode 1c is post-treated in the combustor 4, will be described.

The cathode combustion pipe 19 is connected to a first connecting port 44 of the combustor 4 so that the gas flowing through the cathode combustion pipe 19 is guided to the flame burner 41 of the combustor 4. Likewise, the combustion fan 18 is connected to a second connecting port 45 of the combustor 4 so that the air is guided to the flame burner 41 of the combustor 4. A combustion tube 40 is provided to cover the flame burner 41. An exhaust pipe 23 is provided on a side surface of the combustion tube 40, and the exhaust gas (gas containing nitrogen as main component) generated by combustion in the flame burner 41 is discharged to outside (atmosphere) through the exhaust pipe 23. An auxiliary material supply pipe 22 (see FIG. 5) configured to branch from a position of the material supply device 33 and a fuel gas return pipe 35 are connected to a third connecting port 46 of the combustor 4 to allow the feed gas or/and the fuel gas flowing through these pipes 22 and 35 to be guided to and combusted in the flame burner 41 to heat the fuel generator 2.

In the third embodiment, since the feed gas filled in the cathode 1c is supplied to the flame burner 41, a combustion state is undesirably disturbed by the supply of the feed gas to the flame burner 41 if the combustion in the flame burner 41 starts before the post-treatment of the feed gas is completed. For this reason, the supply of the feed gas to the flame burner 41 starts before the combustion in the flame burner 41 starts. After all the feed gas filled in the cathode 1c has been sent to and treated in the combustor 4 and discharged to outside, the combustion in the flame burner 41 starts. A flame rod 42 which is capable of detecting an ion current flowing through the flame during the combustion or a thermocouple 43, is equipped in the flame burner 41, and the controller 21 monitors whether or not the flame burner 41 is conducting combustion, based on a detection signal from the flame rod 41 or the thermocouple 43.

The feed gas filled in the cathode 1c is treated in the above constructed combustor 4.

The feed gas filled in the cathode 1c is purged therefrom by the air supplied from the blower 5 to flow into the cathode combustion pipe 19, and is supplied to the flame burner 41 through the first connecting port 44 of the combustor 4. Simultaneously, the air from the combustion fan 18 is supplied to the flame burner 41 through the second connecting port 45. As a result, the feed gas flowing through the cathode combustion pipe 19 and the air from the combustion fan 18 are mixed with each other in the flame burner 41 of the combustor 4 so that the combustible gas in the gas mixture is diluted to have a concentration lower than the combustion lower limit, and then the resulting gas mixture is discharged to outside the fuel cell system 39.

In this case, the controller 21 controls the flow rate of the blower 5 and the flow rate of the combustion fan 18 so that the concentration of the combustible gas in the flame burner 41 becomes lower than the lower limit concentration. In the case of using the city gas 13A available in a big city as the feed gas, since the city gas 13A has a combustion range of approximately 5 to 15% in a mixing ratio with respect to the air, the concentration of the combustible gas in the gas mixture finally discharged can be decreased to lower than 5% by controlling setting so that the flow rate of the air supplied from the combustion fan 18 becomes more than twenty times as high as the flow rate of the air supplied from the blower 5. After all the feed gas filled in the cathode 1c of the fuel cell 1 has been discharged to outside the fuel cell system 39 while being diluted to have a concentration lower than the combustion lower limit, the combustion pipe valve 20 is closed.

Thereafter, the series of operations of the fuel cell system 39 are carried out to start power generation. These operations are identical to those of the first embodiment.

In the power generation the fuel cell system 39, an incombustible oxidizing gas (e.g., air) supplied from the blower 5 purges the combustible feed gas (e.g., city gas 13A) filled in the cathode 1c to the flame burner 41 of the combustor 4, along with the oxidizing gas, and the incombustible oxidizing gas (e.g., air) from the combustion fan 18 is supplied to the flame burner 41 of the combustor 4 so that these gases are mixed with each other in the combustor 4. In this case, by adjusting the flow rate of the air supplied from the blower 5 and the flow rate of the air supplied from the combustion fan 18, the combustible gas in the gas mixture can be diluted to have a concentration lower than the combustion lower limit concentration, and in this diluted state, the gas mixture can be discharged to atmosphere. In this manner, the combustible gas filled in the cathode 1c can be appropriately post-treated.

During the stop period of the power generation of the fuel cell system 39, the feed gas is confined in the cathode 1c of the fuel cell 1. In addition, the combustible gas (fuel gas) is filled and confined in the anode 1a. This makes it possible to completely eliminate a cause of oxidization of the catalyst in the anode 1a of the fuel cell 1, and hence to avoid reduction of durability of the anode 1a of the fuel cell system 39.

Further, since the stop operation and keeping operation of the fuel cell system 39 are carried out with the first exit-side and inlet-side valves 12a and 12b of the cathode closing device 12 closed and the combustion pipe valve 20 closed, the feed gas supplied to the cathode 1c of the fuel cell 1 by the cathode feed gas supply device 11 can be reliably confined in the fuel cell 1, and if the feed gas is kept for a long time period under the stopped state of the fuel cell 1, the air will not enter the cathode 1c of the fuel cell 1. Consequently, reduction of durability of the fuel cell system 39 can be inhibited.

Embodiment 4

Figure 5:
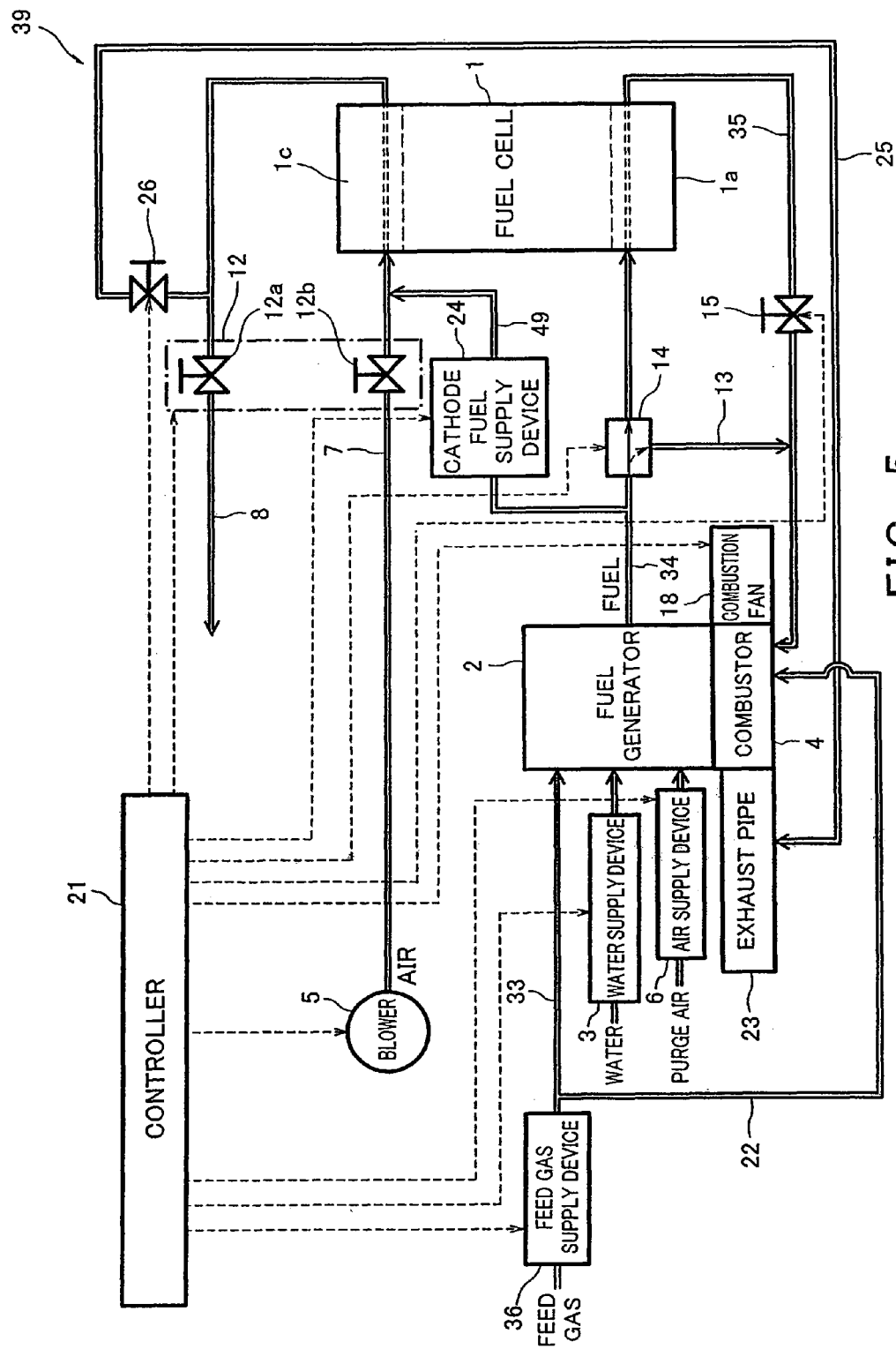
FIG. 5 is a block diagram schematically showing a construction of a fuel cell system according to a fourth embodiment of the present invention.

FIG. 5 is a block diagram schematically showing a construction of a fuel cell system according to a fourth embodiment of the present invention. The fourth embodiment illustrates an alternation of the piping in the third embodiment. In FIG. 5, the same reference numerals as those in FIG. 3 denote the same or corresponding parts, which will not be further described.

Referring to FIG. 5, in the construction of the fifth embodiment, the cathode combustion pipe 19 (see FIG. 3 of the third embodiment) connecting the portion of the cathode discharge pipe 8 which is located upstream of the first exit-side valve 12a to the combustor 4 has been replaced by a cathode exhaust pipe 25 extending from a position of the cathode discharge pipe 8 which is located upstream of the first exit-side valve 12a and connected to the exhaust pipe 23 (see FIG. 4), and an exhaust pipe valve 26 is provided in the cathode exhaust pipe 25 and configured to control start and stop of the air supply. Also, the cathode feed gas supply pipe 32 (see FIG. 3 of the third embodiment) connecting the portion of the material supply pipe 33 which is located just after the exit of the feed gas supply device 36 to the portion of the cathode supply pipe 7 which is located downstream of the first inlet-side valve 12b has been replaced by a cathode fuel supply pipe 49 connecting the anode supply pipe 34 which is located just after the exit of the fuel generator 2 to the portion of the cathode supply pipe 7 which is located downstream of the first inlet-side valve 12b. In addition, the cathode feed gas supply device 11 (see FIG. 3) provided in the cathode feed gas supply pipe 32 has been replaced by a cathode fuel supply device (combustible gas supply device) 24 provided in the cathode fuel supply pipe 49. Further, an auxiliary material supply pipe 22 is provided to branch a position of the material supply pipe 33 and configured to guide the feed gas to the flame burner 41 of the combustor 4.

The combustible gas diluting device is formed by the exhaust pipe 23 through which the exhaust gas generated by combustion in the combustor 4 is discharged to atmosphere, the cathode exhaust pipe 25 extending from a position of the cathode discharge pipe (oxidizing passage) 8 which is the oxidizing gas passage between the first exit-side valve (second oxidizing gas passage valve) 12a and the cathode 1c and connected to the flame burner 41, and the exhaust pipe valve 26 configured to open and close the cathode exhaust pipe 25.

Hereinafter, the operation of the fuel cell system 39 in a power generation period, including the stop operation and the start operation (start-up operation) will be described with reference to FIGS. 4 and 5. It will be appreciated that the operation identical to that of the third embodiment will not be further described.

During the power generation period of the fuel cell system 39, the feed gas supplied from the feed gas supply device 36 and the water supplied from the water supply device 3 are reformed within the fuel generator 2 to generate a hydrogen-rich fuel gas, with the temperature of the fuel generator 2 kept at approximately 700° C. The fuel gas from the fuel generator 2 flows through the passage switching device 14 provided in the anode supply pipe 34, and is supplied to the anode 1a of the fuel cell 1 (under the condition in which the passage switching device 14 allows communication between the anode supply pipe 34 and the anode 1a). The air from the blower 5 is supplied to the cathode 1c of the fuel cell 1 through the cathode supply pipe 7 and the first inlet-side valve 12b in an open position. Within the fuel cell 1, the fuel gas (hydrogen) and the air (oxidizing gas) are consumed to generate electric power. The fuel gas unconsumed in the power generation of the fuel cell 1 is sent to the combustor 4 through the fuel gas return pipe 35 and the return pipe valve 15 in an open position, and combusted therein to produce a heat source for keeping the temperature of the fuel generator 2. If the remaining fuel gas from the fuel cell 1 is insufficient to keep the temperature of the fuel generator 2 appropriately, then the feed gas is additionally supplied to the flame burner 41 of the combustor 4 through the auxiliary material supply pipe 22, and the air is supplied from the combustion fan 18 to the flame burner 41 while adjusting the flow rate of the air to allow the added feed gas to be stably combusted. Meanwhile, the air unconsumed in the power generation of the fuel cell 1 is discharged to atmosphere through the cathode discharge pipe 8 and the first exit-side valve 12a in an open position.

Subsequently, in the stop operation of the power generation in the fuel cell system 39, the gas supply to the cathode 1c of the fuel cell 1 is controlled as described below.

The operation of the blower 5 is stopped to stop the air supply to the cathode 1c of the fuel cell 1. And, the cathode fuel supply device 24 operates to guide the fuel gas containing the combustible gas to the portion of the cathode supply pipe 7 which is located downstream of the first inlet-side valve 12b through the cathode fuel supply pipe 49, and to the cathode 1c of the fuel cell 1 through the cathode supply pipe 7. At this time, the exit-side and inlet-side valves 12a and 12b are closed and the exhaust pipe valve 26 is opened. The fuel gas supplied to the cathode 1c purges the air remaining in the cathode 1c of the fuel cell 1 through the exhaust pipe valve 26 and the cathode exhaust pipe 25 to the exhaust pipe 23, from which the air and the fuel gas are discharged. When it is determined that all the remaining air has been discharged, the exhaust pipe valve 26 is closed, and the supply of the fuel gas to the cathode 1c of the fuel cell 1 is stopped by closing the cathode fuel supply device 24.

The fuel gas existing just after the exit of the fuel generator 2 has an increased pressure. By opening the valve which is the cathode fuel supply device 24 located in the cathode fuel supply pipe 49 with one end of the cathode fuel supply pipe 49 connected to the anode supply pipe 34 just after the exit of the fuel generator 2 and the other end connected to the portion of the cathode supply pipe 7 which is located downstream of the first inlet-side valve 12b, the fuel gas can be guided to the portion of the cathode supply pipe 7 which is located downstream of the first inlet-side valve 12b and to the cathode 1c by utilizing an internal pressure of the fuel gas. If the pressure of the fuel gas being supplied is deficient, the fuel gas may be supplied to the cathode 1c under pressure by using a feed pump as the cathode fuel supply device 24.

In this case, as the fuel gas filled in the cathode 1c, the hydrogen-rich gas (e.g., gas having a content of 80% hydrogen) may be used.

The gas supply to the anode 1a of the fuel cell 1 in the stop operation is performed as in the first embodiment.

After the power generation has been stopped by the above described operation, the fuel gas (hydrogen-rich gas) is filled and kept in the anode 1a, and the combustible gas (hydrogen-rich fuel gas) is filled and kept in the cathode 1c, thus inhibiting oxidization and degradation in the anode 1a.

When the fuel cell system 39 starts the power generation (start-up operation), the gas supply to the cathode 1c of the fuel cell 1 is controlled as described below.

The first inlet-side valve 12b and the exhaust pipe valve 26 are opened and the first exit-side valve 12a is closed. In this state, the air starts to be supplied from the blower 5 to the cathode 1c through the cathode supply pipe 7. The oxidizing gas (air) supplied from the blower 5 purges the combustible fuel gas filled in the cathode 1c. The fuel gas is discharged to the cathode discharge pipe 8 along with the air flowing from the cathode supply pipe 7 into the cathode discharge pipe 8 through the cathode 1c of the fuel cell 1. The discharged fuel gas flows to the exhaust pipe 23 through the exhaust pipe valve 26 and the cathode exhaust pipe 25.

With reference to FIG. 4, the post-treatment of the combustible gas (fuel gas) filled in the cathode 1c in the exhaust pipe 23 will be described. The configuration already described in the third embodiment will be omitted.

In the fourth embodiment, the fuel gas filled in the cathode 1c is guided to the exhaust pipe 23. In this manner, the fuel gas can be supplied to the exhaust pipe 23 during a combustion period of the flame burner 41, and mixed with the exhaust gas containing incombustible nitrogen as main component in the exhaust pipe 23 so that the combustible gas in the gas mixture is diluted to have a concentration lower than the combustion lower limit, and discharged to atmosphere. Therefore, in the post-treatment of the fuel gas in the exhaust pipe 23, it is not necessary to delay a start time of combustion in the flame burner 41 as compared to the third embodiment, and a process of the post-treatment of the fuel gas can be simplified.

In this case, the controller 21 controls the flow rate of the oxidizing gas (air) supplied from the blower 5 and the flow rate of the exhaust gas generated in the flame burner 41 so that the concentration of the combustible gas in the exhaust pipe 23 becomes lower than the combustion lower limit. For example, in the case of hydrogen mainly contained in the fuel gas, since hydrogen has a combustion range of about 4 to 75% which is a mixing ratio with air, the concentration of the combustible gas in the gas mixture finally discharged can be decreased to lower than 4% by controlling setting so that the flow rate of the air supplied from the blower 5 becomes lower than 1/25 as much as the amount of the exhaust gas generated by the combustion in the flame burner 41.

After all the feed gas filled in the cathode 1c has been discharged outside the fuel cell system 39 while being diluted so that the concentration of the combustible gas becomes lower than the combustion lower limit, the exhaust pipe valve 26 is closed.

Thereafter, for starting power generation, the series of operations of the fuel cell system 39 are carried out in the same manner described in the first embodiment.

As described above, when the fuel cell system 39 starts power generation, the incombustible oxidizing gas (e.g., air) supplied from the blower 5 purges the combustible fuel gas (e.g., hydrogen-rich gas) filled in the cathode 1*c* to the exhaust pipe 23, and the exhaust gas mainly containing nitrogen generated in the combustion of the flame burner 41 of the combustor 4 is guided to the exhaust pipe 23 to allow these gases to be mixed therein. By adjusting the flow rate of the air supplied from the blower 5, the combustible gas in the gas mixture can be diluted to have a concentration lower than the combustion lower limit, and in this diluted state, the gas mixture can be discharged to atmosphere. In this manner, the combustible gas filled in the cathode 1*c* can be appropriately treated.

During the stop period of the power generation of the fuel cell system 39, the fuel gas is confined in the cathode 1*c* of the fuel cell 1. In addition, the combustible gas (fuel gas) is filled in the anode 1*a*. This makes it possible to completely eliminate a cause of oxidization of the catalyst in the anode 1*a* of the fuel cell 1, and hence to avoid reduction of durability of the anode 1*a* of the fuel cell system 39.

Further, since the stop operation and keeping operation of the fuel cell system 39 are carried out with the first exit-side and inlet-side valves 12*a* and 12*b* of the cathode closing device 12 closed and the exhaust pipe valve 26 closed, the fuel gas supplied to the cathode 1*c* of the fuel cell 1 by the cathode fuel supply device 24 can be reliably confined in the fuel cell 1, and if the fuel gas is kept for a long time period under the stopped state of the fuel cell 1, the air will not enter the cathode 1*c* of the fuel cell 1. Consequently, reduction of durability of the fuel cell system 39 can be inhibited.

Embodiment 5

Figure 6:
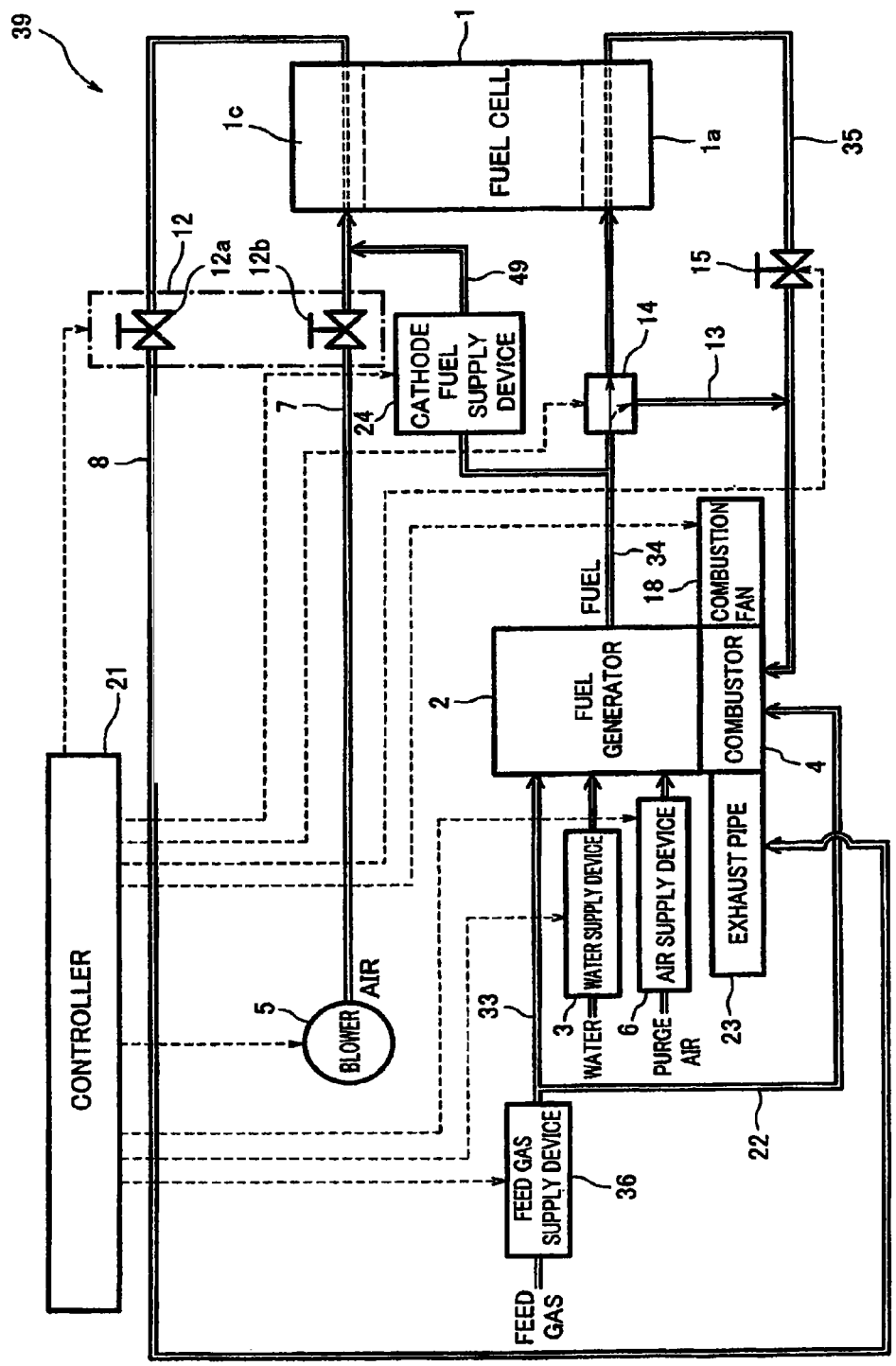
FIG. 6 is a block diagram schematically showing a construction of a fuel cell system according to a fifth embodiment of the present invention.

FIG. 6 is a block diagram schematically showing a construction of a fuel cell system according to a fifth embodiment of the present invention. The fifth embodiment illustrates an alternation of piping of the cathode exhaust pipe in the fourth embodiment. In FIG. 6, the same reference numerals as those in FIG. 5 denote the same or corresponding parts, which will not be further described.

Referring to FIG. 6, the construction (see FIG. 5 of the fourth embodiment) in which the cathode exhaust pipe 25 branching from a position of the cathode discharge pipe 8 which is located upstream of the first exit-side valve 12*a* and connected to the exhaust pipe 23 has been replaced by the construction in which the cathode discharge pipe 8 which is the oxidizing gas passage is directly connected to the exhaust pipe 23. Also, the exhaust pipe valve 26 provided in the cathode exhaust pipe 25 and configured to control start and stop of the air supply to the cathode exhaust pipe 25 has been eliminated in the construction of FIG. 6. Since the exhaust pipe valve 26 or the cathode exhaust pipe 25 can be omitted, the gas supply pipe system can be simplified as compared to the fourth embodiment.

The combustible gas diluting device is formed by connecting the exhaust pipe 23 through which the exhaust gas generated by the combustion in the combustor 4 is guided to atmosphere to the portion of the cathode discharge pipe (oxidizing gas passage) 8 which is located downstream of the first exit-side valve (second oxidizing gas passage valve) 12*a*.

Hereinbelow, an operation of the fuel cell system 39, including a stop operation and a start operation (start-up operation) of the power generation will be described in detail with reference to FIG. 6. The operation of the fuel cell system 39 during a power generation period is identical to that of the first and fourth embodiment, and will not be further described.

During the stop operation of the fuel cell system 39, the gas supply to the cathode 1*c* of the fuel cell 1 is controlled as described below.

The operation of the blower 5 is stopped to stop the air supply to the cathode 1*c* of the fuel cell 1. And, as already described in the fourth embodiment, the cathode fuel supply device 24 guides the fuel gas containing the combustible gas to the portion of the cathode supply pipe 7 which is located downstream of the inlet-side valve 12*b* through the cathode fuel supply pipe 49, and to the cathode 1*c* of the fuel cell 1 through the cathode supply pipe 7. At this time, the first inlet-side valve 12*b* is closed and the first exit-side valve 12*a* is opened. The fuel gas supplied to the cathode 1*c* purges the air remaining in the cathode 1*c* of the fuel cell 1 through the first exit-side valve 12*a* and the cathode discharge pipe 8, and the air is discharged outside from the exhaust pipe 23. When it is determined that all the remaining air has been discharged, the first exit-side valve 12*a* is closed and the supply of the fuel gas to the cathode 1*c* of the fuel cell 1 is stopped by closing the cathode fuel supply device 24.

In the fifth embodiment, as the fuel gas filled in the cathode 1*c*, the hydrogen-rich gas (e.g., gas having a content of 80% hydrogen) may be used.

The gas is supplied to the anode 1*a* of the fuel cell 1 in the stop operation as in the first embodiment.

After the power generation has been stopped by the above described operation, the fuel gas (hydrogen-rich gas) is filled and kept in the anode 1*a*, and the combustible gas (hydrogen-rich fuel gas) is filled and kept in the cathode 1*c*, thereby inhibiting oxidization and degradation of the anode 1*a*.

When the fuel cell system 39 starts power generation (start-up operation), the gas supply to the cathode 1*c* of the fuel cell 1 is controlled as described below.

The first inlet-side valve 12*b* and the first exit-side valve 12*a* are closed. Under this condition, the air starts to be supplied from the blower 5 to the cathode 1*c* through the cathode supply pipe 7. The oxidizing gas (air) supplied from the blower 5 purges the combustible fuel gas filled in the cathode 1*c* into the cathode discharge pipe 8. That is, the fuel gas is discharged into the exhaust pipe 23 through the cathode discharge pipe 8 along with the air flowing from the cathode supply pipe 7 to the cathode discharge pipe 8 through the cathode 1*c* of the fuel cell 1.

The treatment of the combustible gas (fuel gas) filled in the cathode 1*c* in the exhaust pipe 23 is identical to that of the fourth embodiment.

As described above, when the fuel cell system 39 starts power generation, the incombustible oxidizing gas (e.g., air) supplied from the blower 5 purges the combustible fuel gas (e.g., hydrogen-rich fuel gas) filled in the cathode 1*c* into the exhaust pipe 23, and the exhaust gas mainly containing nitrogen generated in the combustion of the flame burner 41 of the combustor 4 is guided to the exhaust pipe 23 to allow these gases to be mixed therein. In this case, by adjusting the flow rate of the air supplied from the blower 5, the combustible gas in the gas mixture can be diluted to have a concentration lower than the combustion lower limit, and in this diluted state, the gas mixture can be discharged to atmosphere. In this manner, the combustible gas filled in the cathode 1*c* can be appropriately post-treated.

During the stop period of the power generation of the fuel cell system 39, the fuel gas is filled and kept in the cathode 1*c* of the fuel cell 1. In addition, the combustible gas (fuel gas) is filled in the anode 1*a*. This makes it possible to completely eliminate a cause of oxidization of the catalyst in the anode 1a of the fuel cell 1, and hence to avoid reduction of durability of the anode 1a of the fuel cell system 39.

Further, since the stop operation and keeping operation of the fuel cell system 39 is carried out with the first exit-side and inlet-side valves 12a and 12b of the cathode closing device 12 closed, the fuel gas supplied to the cathode 1c of the fuel cell 1 by the cathode fuel supply device 24 can be reliably confined in the fuel cell 1, and if the fuel gas is kept for a long time period under the stopped state of the fuel cell 1, the air will not enter the cathode 1c of the fuel cell 1. Consequently, reduction of durability of the fuel cell system 39 can be inhibited.

Embodiment 6

Figure 7:
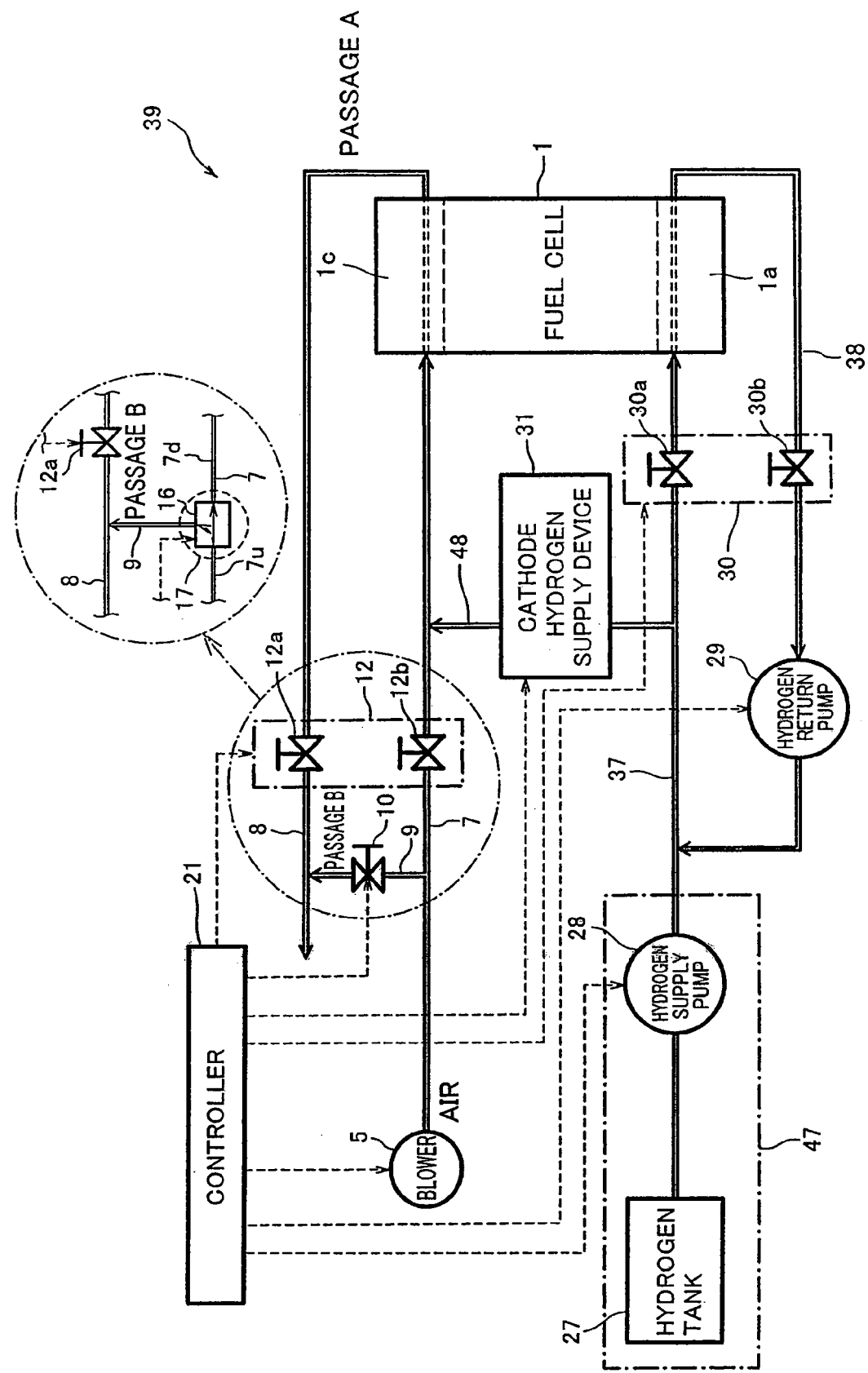
FIG. 7 is a block diagram schematically showing a construction of a fuel cell system according to a sixth embodiment of the present invention.

FIG. 7 is a block diagram schematically showing a construction of a fuel cell system according to a six embodiment of the present invention.

The sixth embodiment illustrates an alternation of gas supply system of the fuel cell system 39 of the first embodiment. In FIG. 7, the same reference numerals as those in FIG. 1 denote the same or corresponding parts, which will not be further described.

Referring to FIG. 7, the fuel cell system 39 comprises a polymer electrolyte fuel cell 1, a hydrogen supply device 47, a hydrogen return pump 29, an anode closing device 30, a blower 5, a cathode bypass pipe (cathode bypass passage) 9, a cathode bypass valve 10, a cathode closing device 12, and a cathode hydrogen supply device (combustible gas supply device) 31. The fuel cell 1 is configured to generate electric power using hydrogen and an oxidizing gas (air). The hydrogen supply device 47 includes a hydrogen tank 27 that stores hydrogen as a fuel gas and a hydrogen supply pump 28 which pumps to supply hydrogen from the hydrogen tank 27 to the anode 1a of the fuel cell 1 through the hydrogen supply pipe 37 The hydrogen return pump 29 is configured to pump to cause remaining hydrogen exhausted from the anode 1a to a hydrogen exhaust pipe 38 to return to the fuel cell 1. The anode closing device 30 includes a second inlet-side valve 30a and a second exit-side valve 30b configured to open and close inlet and exit of the anode 1a of the fuel cell 1. The blower 5 is configured to supply the air which is the oxidizing gas to the cathode 1c of the fuel cell 1 through the cathode supply pipe 7 which is the oxidizing gas passage and to discharge the remaining air from the cathode 1c to the cathode discharge pipe 8 which is the oxidizing gas passage. The air supplied from the blower 5 is guided into the cathode discharge pipe 8 through the cathode bypass pipe (cathode bypass passage) 9 without flowing through the fuel cell 1. The cathode bypass valve 10 is provided in the cathode bypass pipe 9 and configured to open and close the pipe 9. The cathode closing device 12 includes a first inlet-side valve (first oxidizing gas passage valve) 12b and a first exit-side valve (second oxidizing gas passage valve) 12a configured to open and close an inlet and an exit of the cathode 1c of the fuel cell 1. The cathode hydrogen supply device 31 is configured to supply hydrogen to the cathode 1c of the fuel cell 1 through a cathode hydrogen supply pipe 48.

The combustible gas diluting device is formed by the cathode bypass pipe (cathode bypass passage) 9 connecting the portion of the cathode supply pipe 7 which is located upstream of the first-inlet side valve (first oxidizing gas passage valve) 12b to the portion of the cathode discharge pipe (oxidizing gas passage) 8 which is located downstream of the first exit-side valve (second oxidizing gas passage valve) 12a, and the cathode bypass valve 10 configured to open and close the cathode bypass pipe 9.

The cathode bypass valve 10, the first exit-side and inlet-side valves 12a and 12b of the cathode closing device 12, the second inlet-side and exit-side valves 30a and 30b of the anode closing device 30 are formed by, for example, electromagnetic valves, and the cathode hydrogen supply device 31 is formed by, for example, a valve or a pump.

The controller 21 is electrically connected to the blower 5, the hydrogen supply pump 28, the hydrogen return pump 29, the cathode hydrogen supply device 31, and the valves 10, 12a, 12b, 30a, and 30b and configured to control these components to properly control the fuel cell system 39 to be described later. The components to be controlled by the controller 21 are indicated by a dashed line in FIG. 7.

Hereinbelow, the operation of the fuel cell system 39 in a power generation period, including the stop operation and the start operation (start-up operation) will be described with reference to FIG. 7.

During the power generation period of the fuel cell system 39, hydrogen stored in the hydrogen tank 27 is supplied by the hydrogen supply pump 28 to the anode 1a of the fuel cell 1 through the hydrogen supply pipe 37, and hydrogen unconsumed in the anode 1a of the fuel cell 1 is exhausted into the hydrogen exhaust pipe 38 and retuned to the anode 1a of the fuel cell 1 by the hydrogen return pump 29 provided in the hydrogen exhaust pipe 38. The second inlet-side and exit-side valves 30a and 30b are opened.

The air from the blower 5 is supplied from the blower 5 to the cathode 1c of the fuel cell 1 through the cathode supply pipe 7, and the air unconsumed in the cathode 1c is discharged to atmosphere through the cathode discharge pipe 8. The first exit-side and inlet-side valves 12a and 12b are opened.

During the stop operation of the power generation in the fuel cell system 39, the gas supply to the cathode 1c of the fuel cell 1 is controlled as described below.

The operation of the blower 5 is stopped to stop the air supply to the cathode 1c of the fuel cell 1. Thereby, the power generation in the fuel cell 1 stops. And, the cathode hydrogen supply device 31 guides the combustible hydrogen to the portion of the cathode supply pipe 7 which is located downstream of the first inlet-side valve 12b through the cathode hydrogen supply pipe 48, and to the cathode 1c of the fuel cell 1 through this portion of the cathode supply pipe 7. At this time, the first inlet-side valve 12b is closed and the first exit-side valve 12a is opened. When it is determined that all the air remaining in the cathode 1c of the fuel cell 1 has been purged by the hydrogen supplied to the cathode 1c and discharged from the cathode 1c to outside (atmosphere) through the cathode discharge pipe 8, the first exit-side valve 12a of the cathode closing device 12 is closed and the supply of hydrogen to the cathode 1c of the fuel cell 1 is stopped by closing the cathode hydrogen supply device 31 in a case where the cathode hydrogen supply device 31 is formed by a valve.

The hydrogen existing just after the exit of the hydrogen supply pump 28 has an increased pressure. By opening the valve which is the cathode hydrogen supply device 31 in the cathode hydrogen supply pipe 48 with one end of the cathode hydrogen supply pipe 48 connected to the hydrogen supply pipe 37 just after the exit of the hydrogen supply pump 28 and the other end thereof connected to the portion of the cathode supp pipe 7 which is located downstream of the first inlet-side valve 12b, hydrogen can be guided to the portion of the cathode supply pipe 7 which is located downstream of the first inlet-side valve 12b and to the cathode 1c by utilizing an internal pressure of hydrogen. If the pressure of the hydrogen being supplied is deficient, hydrogen may be supplied to the cathode 1c under pressure by using a feed pump as the cathode hydrogen supply device 31.

Since the amount of air remaining in the cathode 1c can be known in advance, the controller 21 determines the flow rate of hydrogen which can purge almost all the air based on the amount of remaining air.

When the fuel cell system 39 terminates the stop operation of power generation, the second exit-side and inlet-side valves 30b and 30a of the anode closing device 30 are closed to confine the hydrogen in the anode 1a of the fuel cell 1, and then, the operations of the hydrogen supply pump 28 and the hydrogen return pump 29 are stopped.

After the power generation has been stopped by the above described operation, hydrogen is filled and kept in the anode 1a of the fuel cell 1, and the combustible gas (hydrogen) is filled and kept in the cathode 1c of the fuel cell 1. By doing so, oxidization and degradation of the anode 1a are inhibited.

When the fuel cell system 39 starts power generation (starts-up operation), the gas supply to the cathode 1c of the fuel cell 1 is controlled as described below.

The first inlet-side and exit-side valves 12b and 12a of the cathode closing device 12 and the cathode bypass valve 10 are all opened, and the air starts to be supplied from the blower 5 to the cathode 1c through the cathode supply pipe 7. The air supplied from the blower 5 flows through a passage A, i.e., from the cathode supply pipe 7 to the cathode discharge pipe 8 through the cathode 1c of the fuel cell 1 and a passage B, i.e., from the cathode supply pipe 7 to the cathode bypass pipe 9 to flow through the cathode bypass valve 10. The air flowing through the passage A purges hydrogen filled in the cathode 1c, and these gases are discharged into the cathode discharge pipe 8. The hydrogen is mixed with the air flowing through the passage B at a point where the cathode discharge pipe 8 is connected to the cathode bypass pipe 9 so that the combustible gas in the gas mixture is diluted to have a concentration lower than the combustion lower limit, and the resulting gas mixture is discharged outside (to atmosphere) of the fuel cell system 39.

The flow rate of the air flowing through the passage A and the flow rate of the air flowing through the passage B are adjusted according to passage resistances described below. The flow rates are set so that the concentration of the combustible gas in the gas mixture discharged outside the fuel cell system 39 becomes lower than the combustion lower limit. Specifically, since hydrogen has a combustion range of about 4 to 75% in a mixing ratio with air, the concentration of the combustible in the gas mixture finally discharged becomes lower than 4% by setting the flow rate of the air per unit time flowing through the passage B becomes more than 25 times as high as the flow rate of the air per unit time flowing through the passage A. Since the passage resistance of the gas mixture flowing through the passage A is predictable, (flow rate per unit time of the passage B)/(flow rate per unit time of the passage A)>25 can be set by adjusting, for example, an aperture diameter of the valve which is the cathode bypass valve 10 to thereby control the passage resistance of the passage B.

After hydrogen filled in the cathode 1c of the fuel cell 1 has been discharged to outside the fuel cell system 39, the cathode bypass valve 10 is closed, and the air is supplied from the blower 5 only to the cathode 1c of the fuel cell 1, thereby enabling power generation to start.

Figure 8:
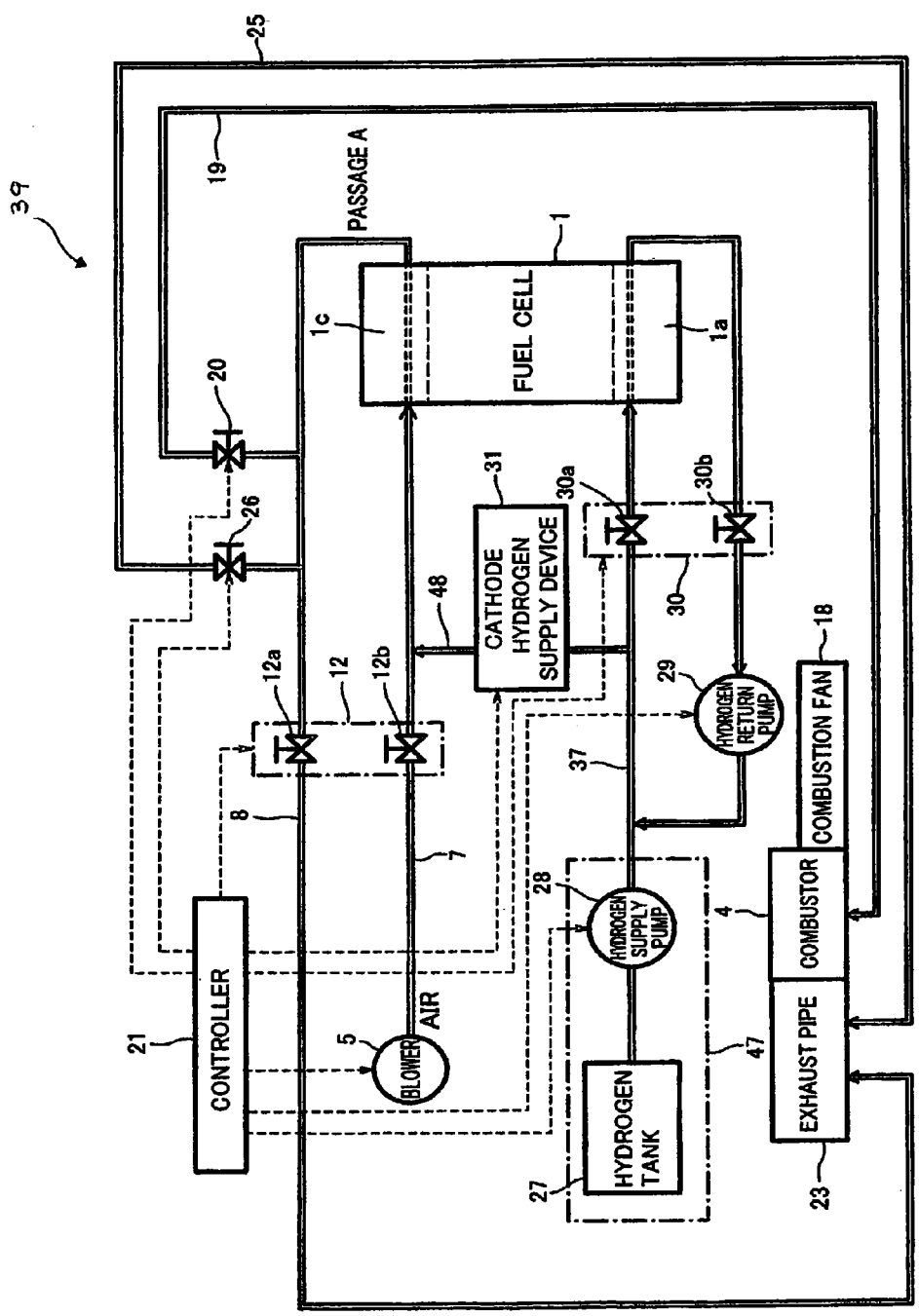
FIG. 8 is a block diagram schematically showing an alternative construction of the fuel cell system according to the sixth embodiment.
Figure 9:
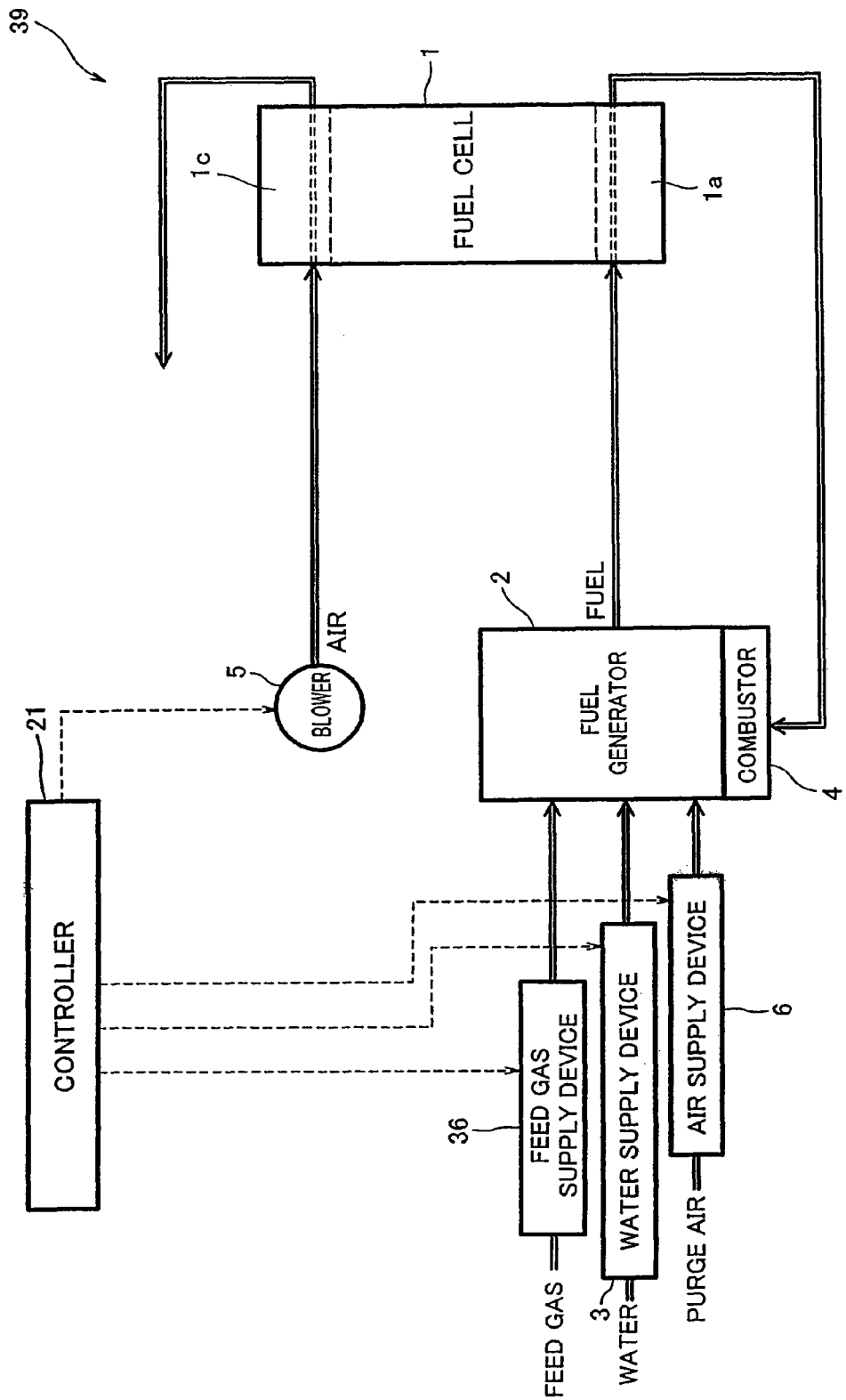
FIG. 9 is a block diagram schematically showing a construction of the conventional fuel cell system.

As the means for mixing the air flowing through the cathode supply pipe 7 with the combustible gas flowing through the cathode discharge pipe 8, the dividing device 16 of the second embodiment may be used in the sixth embodiment instead of the cathode bypass valve 10. Specifically, as shown in the portion represented by the dotted line in FIG. 7, the dividing device 16 is provided at the connecting portion 17 between the cathode bypass pipe 9 and the cathode supply pipe 7, instead of the cathode bypass valve 10 in the cathode bypass pipe 9. The dividing device 16 is capable of dividing the gas flowing through the upstream cathode bypass pipe 7u into the gas flowing through the downstream cathode supply pipe 7d and the gas flowing through the cathode bypass pipe 9. Also, while the first inlet-side valve 12b of the cathode closing device 12 is replaced by the dividing device 16, the first exit-side valve 12a which is the cathode exit closing device exists. The dividing device 16 adjusts the ratio between the flow rate of the gas flowing through the downstream cathode supply pipe 7d and the flow rate of the gas flowing through the cathode bypass pipe 9 downstream of the connecting portion 17. The adjustment of the ratio made by the dividing device 16 is controlled by the controller 21. Alternatively, using the combustor 4 or the exhaust pipe 23, mixing and dilution of the gas (hydrogen) filled in the cathode 1c and air or the exhaust gas may be conducted as in the operation of the third and fifth embodiments. For example, as shown in alternations in FIG. 8, the cathode combustion pipe 19 branching from a position of the cathode discharge pipe 8 may be connected to the flame burner 41 of the combustor 4, and the combustion pipe valve 20 may be provided in the cathode combustion pipe 19 (corresponding to the construction in the third embodiment), the cathode exhaust pipe 25 branching from a position of the cathode discharge pipe 8 may be connected to the exhaust pipe 23 and the exhaust pipe valve 26 may be provided in the cathode exhaust pipe 25 (corresponding to a fourth embodiment), or the cathode discharge pipe 8 may be directly connected to the exhaust pipe 23 (corresponding to the fifth embodiment), so that hydrogen filled in the cathode 1c is mixed with incombustible gas in the combustor 4 or the exhaust pipe 23 to be diluted, and the resulting gas mixture is discharged to atmosphere.

In the start operation (start-up operation) of the power generation in the fuel cell system 39, the second exit-side and inlet-side valves 30a and 30b of the anode closing device 30 are opened, and then the operation of the hydrogen supply pump 28 and the operation of the hydrogen return pump 29 start.

As described above, when the fuel cell system 39 starts power generation, the incombustible oxidizing gas (e.g., air) supplied from the blower 5 flows through the passage A, i.e., from the cathode supply pipe 7 to the cathode discharge pipe 8 through the fuel cell 1 and the passage B, i.e., to the cathode bypass pipe 9 provided with the cathode bypass valve 10. With the passages A and B set to have predetermined resistances, the air flows therethrough.

When the air flowing through the passage A purges the combustible hydrogen filled in the cathode 1c into the cathode discharge pipe 8, the discharged hydrogen is mixed with the air flowing through the passage B so that the combustible gas in the gas mixture is diluted to have a concentration lower than a combustion lower limit, and the diluted gas mixture is discharged to atmosphere.

During the stop period of the power generation of the fuel cell system 39, hydrogen is filled and kept in the cathode 1c of the fuel cell 1. In addition, the combustible gas (hydrogen) is filled in the anode 1a. This makes it possible to completely eliminate a cause of oxidization of the catalyst in the anode 1a of the fuel cell 1, and hence to avoid reduction of durability of the anode 1a of the fuel cell system 39.

Further, since the stop operation and keeping operation of the fuel cell system 39 is carried out with the first inlet-side and exit-side valves 12b and 12a of the cathode closing device 12 closed, hydrogen supplied to the cathode 1c of the fuel cell 1 by the cathode hydrogen supply device 31 can be confined in the fuel cell 1, and if hydrogen is kept for a long time period under the stopped state of the fuel cell 1, the air will not enter the cathode 1c of the fuel cell 1. Consequently, reduction of durability of the fuel cell system 39 can be inhibited.

As thus far described, in the stop operation of the power generation in the fuel cell system 39, the feed gas supplied from the feed gas supply device 36 to the anode 1a is used as the combustible gas filled in the cathode 1c (first, second and third embodiments: FIGS. 1, 2, and 3), the fuel gas produced from the feed gas in the fuel generator 2 (hydrogen-rich gas having a content of about 80% hydrogen) is used as the combustible gas filled in the cathode 1c in the fourth and fifth embodiments (FIGS. 5 and 6), and hydrogen (pure hydrogen having a content of 100% hydrogen) supplied from the hydrogen supply device 47 to the anode 1a in the sixth embodiment (FIG. 7) is used as the combustible gas filled in the cathode 1c.

In the first to fifth embodiments, other than the sixth embodiment using hydrogen, one of the feed gas and the fuel gas may be suitably selected according to a change in predetermined piping. It is desirable to fill and keep hydrogen in a high concentration, for the purpose of improving durability of platinum catalyst. Nonetheless, the hydrogen must be treated carefully when hydrogen which has a combustion concentration range wider than those of other gases is discharged to atmosphere.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of operating a fuel cell system, the method comprising steps of:
   (a) stopping power generation of a fuel cell which generates electric power using a fuel gas and an oxidizing gas;
   (b) filling a cathode of the fuel cell with a combustible gas in a stop operation of the fuel cell system after step (a) and keeping the filled combustible gas in the cathode until starting a start-up operation of the fuel cell system;
   (c) supplying the oxidizing gas to the cathode and discharging the combustible gas filled in the cathode with the oxidizing gas after step (b);
   (d) supplying the combustible gas discharged from the cathode in response to step (c) to a combustor configured to heat a fuel generator for generating the fuel gas or to an exhaust pipe connected to the combustor via a branch passage branching from an oxidizing gas passage located downstream of the cathode;
   (e) diluting the combustible gas supplied to the combustor with air supplied to the combustor or the combustible gas supplied to the exhaust pipe with exhaust gas supplied to the exhaust pipe, such that the combustible gas has a concentration lower than a combustion lower limit; and
   (f) discharging the diluted combustible gas to atmosphere.

2. The method according to claim 1, wherein the fuel generator is configured to generate the fuel gas from a feed gas and the combustible gas is one of the fuel gas and the feed gas.

3. The method according to claim 1, further comprising the step of:
   (c-1) opening a first oxidizing gas passage valve provided at the oxidizing gas passage located upstream of the cathode and opening an on-off valve provided at the branch passage before step (c).

4. The method according to claim 1, further comprising the step of:
   (g) supplying the oxidizing gas to the cathode in the state of opening the oxidizing gas passage and closing the branch passage during power generation of the fuel cell after step (f).

5. The method according to claim 4, further comprising the step of:
   (f-1) opening a second oxidizing gas passage valve provided at the oxidizing gas passage located downstream of the cathode and closing an on-off valve provided at the branch passage in the period between step (f) and step (g).

6. The method according to claim 1, wherein the combustible gas of step (d) is supplied to a flame burner of the combustor.

7. The method according to claim 6, wherein the combustible gas is supplied to the flame burner during a stop period of combustion in the combustor.

8. The method according to claim 1, wherein the exhaust gas generated by combustion in the combustor is guided through the exhaust pipe to atmosphere.

9. The method according to claim 8, wherein the combustible gas is supplied to the exhaust pipe during a combustion period of the combustor.

10. The method according to claim 1, wherein the combustible gas is supplied during a stop period of combustion in the combustor in step (d).

* * * * *